US011860060B2

(12) United States Patent
Owen et al.

(10) Patent No.: US 11,860,060 B2
(45) Date of Patent: Jan. 2, 2024

(54) INTEGRALLY BLADED ROTOR ANALYSIS AND REPAIR SYSTEMS AND METHODS

(71) Applicant: RAYTHEON TECHNOLOGIES CORPORATION, Farmington, CT (US)

(72) Inventors: William D. Owen, Windsor, CT (US); Ron I. Prihar, West Hartford, CT (US); Lawrence P. Roberts, N Palm Beach, FL (US); Ming-Ta Yang, Carlisle, MA (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 17/730,120

(22) Filed: Apr. 26, 2022

(65) Prior Publication Data

US 2023/0314280 A1    Oct. 5, 2023

Related U.S. Application Data

(60) Provisional application No. 63/327,748, filed on Apr. 5, 2022.

(51) Int. Cl.
*G01M 15/14* (2006.01)
*G01H 1/00* (2006.01)

(52) U.S. Cl.
CPC ............ *G01M 15/14* (2013.01); *G01H 1/006* (2013.01)

(58) Field of Classification Search
CPC ............................. G01M 15/14; G01H 1/006
See application file for complete search history.

(56) References Cited

U.S. PATENT DOCUMENTS

| 4,811,253 A | 3/1989 | Johns |
| 4,858,146 A | 8/1989 | Shebini |
| 5,253,978 A | 10/1993 | Fraser |
| 5,993,161 A | 11/1999 | Shapiro et al. |
| 6,814,543 B2 | 11/2004 | Barb et al. |
| 7,068,301 B2 | 6/2006 | Thompson |

(Continued)

FOREIGN PATENT DOCUMENTS

| CA | 3173329 | 7/2021 |
| CN | 110362957 | 10/2019 |

(Continued)

OTHER PUBLICATIONS

European Patent Office, European Partial Search Report dated Aug. 14, 2023 in Application No. 23164760.3.

(Continued)

*Primary Examiner* — Eric S. McCall
(74) *Attorney, Agent, or Firm* — SNELL & WILLMER L.L.P.

(57) ABSTRACT

A method of repairing an integrally bladed rotor (IBR) may comprise: performing a vibratory analysis of a rotor module including a first inspected IBR with a potential repair shape for the IBR; determining an undesirable vibratory characteristic of a second inspected IBR in the rotor module; iterating the potential repair shape for the first IBR to eliminate the undesirable vibratory characteristic of the second inspected IBR; and repairing the first IBR with a selected repair shape based on determining the potential repair shape eliminates the undesirable vibratory characteristic.

20 Claims, 14 Drawing Sheets

(56) References Cited

U.S. PATENT DOCUMENTS

| | | | |
|---|---|---|---|
| 7,082,371 | B2 | 7/2006 | Griffin et al. |
| 8,045,144 | B2 | 10/2011 | Manfred |
| 8,255,170 | B2 | 8/2012 | Kollgaard et al. |
| 8,881,392 | B2 | 11/2014 | Derrien et al. |
| 9,036,892 | B2 | 5/2015 | Domke et al. |
| 9,477,224 | B2 | 10/2016 | Khan et al. |
| 9,739,167 | B2 | 8/2017 | Heinig et al. |
| 10,156,140 | B2 | 12/2018 | Walker et al. |
| 10,191,478 | B2 | 1/2019 | Georgeson et al. |
| 10,379,020 | B2 | 8/2019 | Sever et al. |
| 10,762,255 | B2 | 9/2020 | Feiner et al. |
| 11,434,764 | B2 * | 9/2022 | Morris .................... G06F 30/15 |
| 2004/0148129 | A1 | 7/2004 | Gotoh et al. |
| 2004/0225474 | A1 | 11/2004 | Goldfine et al. |
| 2005/0033555 | A1 | 2/2005 | Tanner et al. |
| 2006/0073022 | A1 | 4/2006 | Gentile et al. |
| 2007/0005527 | A1 | 1/2007 | Parthasarathy |
| 2010/0064515 | A1 | 3/2010 | Eichmann et al. |
| 2011/0166798 | A1 | 7/2011 | Knodel et al. |
| 2013/0170947 | A1 | 7/2013 | Kurt-Elli et al. |
| 2014/0030092 | A1 | 1/2014 | Heining et al. |
| 2014/0100703 | A1 | 4/2014 | Dull et al. |
| 2014/0114587 | A1 | 4/2014 | Czerniak et al. |
| 2016/0246287 | A1 | 8/2016 | Modgil |
| 2017/0176342 | A1 | 6/2017 | Colletti |
| 2017/0370220 | A1 | 12/2017 | Morris et al. |
| 2020/0102827 | A1 | 4/2020 | Morris et al. |
| 2020/0159879 | A1 | 5/2020 | Feiner et al. |
| 2022/0100919 | A1 | 3/2022 | Chakrabarti et al. |

FOREIGN PATENT DOCUMENTS

| | | |
|---|---|---|
| EP | 3220119 | 9/2017 |
| EP | 2507009 | 11/2017 |
| EP | 3705726 | 9/2020 |
| WO | 2020053778 | 3/2020 |
| WO | 2021150579 | 7/2021 |

OTHER PUBLICATIONS

European Patent Office, European Search Report dated Aug. 14, 2023 in Application No. 23164481.6.

European Patent Office, European Search Report dated Aug. 10, 2023 in Application No. 23164480.8.

European Patent Office, European Search Report dated Aug. 10, 2023 in Application No. 23164474.1.

European Patent Office, European Search Report dated Aug. 22, 2023 in Application No. 23166849.2.

European Patent Office, European Search Report dated Aug. 29, 2023 in Application No. 23166874.0.

Khemiri, et al: "Asymtotic description of damping mistuning effects on the forced response of turbomachinery bladed disk", Journal of Sound and Vibration, vol. 332, No. 20, pp. 4998-5013, Dated May 20, 2013.

Ganine, et al: "A sparse preconditioned iterative method for vibration analysis of geometrically mistuned bladed disk", Computers and Structures, Pergamon Press, GB vol. 87, No. 5-6, pp. 342-354, dated Mar. 1, 2009.

Rodriguez, et al: "Analysis of expirimental results of turbomachinery fluttes using an asymptotic reduced order model", Journal of Sound and Vibration, Elsevier, Amsterdam, NL, vol. 509, 15 pages dated May 25, 2021.

Beck, et al. "Probabilistic Study of Intergrally Bladed Rotor Blends using Geometric Mistuning Models" 58th AIAA/ASCE/AHS/ASC Structures, Structural Dynamics, and Materials Confrence, 12 pages dated Jan. 5, 2017.

European Patent Office, European Search Report dated Aug. 29, 2023 in Application No. 23166868.2.

European Patent Office, European Search Report dated Aug. 14, 2023 in Application No. 23164852.8.

European Patent Office, European Search Report dated Aug. 22, 2023 in Application No. 23166856.7.

European Patent Office, European Search Report dated Aug. 29, 2023 in Application No. 23166872.4.

European Patent Office, European Search Report dated Aug. 22, 2023 in Application No. 23166863.3.

European Patent Office, European Search Report dated Aug. 29, 2023 in Application No. 23166864.1.

European Patent Office, European Search Report dated Aug. 29, 2023 in Application No. 23164478.2.

Bai Bin et al: "Application of multi-stage multi-objective multi-disciplinary agent model based on dynamic substructural method in Mistuned Blisk", Aerospace Science and Technology, Elsevier Masson, FR, vol. 46, Jul. 8, 2015, pp. 104-115, DOI: 10.1016/J.AST.2015.06.030.

D'Souza Kiran et al: "Analyzing mistuned multi-stage turbomachinery rotors with aerodynamic effects", Journal of Fluids and Structures, Academic Press, Amsterdam, NL, vol. 42, Aug. 17, 2013, pp. 388-400, DOI: 10.1016/J.JFLUIDSTRUCTS.2013.07.007.

Nyssen Fet Al: "Experimental modal identification of mistuning in an academic two-stage drum", Mechanical Systems and Signal Processing, vol. 88, Nov. 14, 2016 (Nov. 14, 2016), pp. 428-444, DOI: 10.1016/J.YMSSP.2016.10.030.

* cited by examiner

INTEGRALLY BLADED ROTOR ANALYSIS AND REPAIR SYSTEMS AND METHODS

CROSS-REFERENCE TO RELATED APPLICATIONS

This application is a non-provisional of, and claims priority to, and the benefit of U.S. Provisional Application No. 63/327,748, entitled "BLADED ROTOR INSPECTION, ANALYSIS AND REPAIR SYSTEMS AND METHODS," filed on Apr. 5, 2022, which is hereby incorporated by reference in its entirety.

FIELD

The present disclosure relates to repair analysis methods and systems, and more particularly, the repair analysis systems and methods for bladed rotors of gas turbine engines.

BACKGROUND

Gas turbine engines (such as those used in electrical power generation or used in modern aircraft) typically include a compressor, a combustor section, and a turbine. The compressor and the turbine typically include a series of alternating rotors and stators. A rotor generally comprises a rotor disk and a plurality of blades. The rotor may be an integrally bladed rotor ("IBR") or a mechanically bladed rotor.

The rotor disk and blades in the IBR are one piece (i.e., monolithic, or nearly monolithic) with the blades spaced around the circumference of the rotor disk. Conventional IBRs may be formed using a variety of technical methods including integral casting, machining from a solid billet, or by welding or bonding the blades to the rotor disk.

Ideally, all the blades on an IBR are identical to each other, but this is not the case in reality. When it comes to vibration, no two blades of an IBR are alike, nor are two IBRs alike. Every IBR has a unique set of properties that causes the IBR to vibrate differently from all other IBRs, even those of the same design. Differences in individual blades due to manufacturing tolerances, wear, damage, or repair will cause them to vibrate differently. This phenomenon of a change in vibration amplitude (e.g., forced response or stress) that can result from blade-to-blade coupling caused by variation in frequency is called mistuning. Because of mistuning and associated complete vibrational behavior, some blades of an IBR can vibrate at greater amplitudes relative to other blades of the IBR. Blades with a higher vibratory response are more susceptible to high cycle fatigue damage.

SUMMARY

A method of repairing an integrally bladed rotor (IBR) is disclosed herein. The method may comprise: performing a vibratory analysis of a rotor module including a first inspected IBR with a potential repair shape for the IBR; determining an undesirable vibratory characteristic of a second inspected IBR in the rotor module; iterating the potential repair shape for the first IBR to eliminate the undesirable vibratory characteristic of the second inspected IBR; and repairing the first IBR with a selected repair shape based on determining the potential repair shape eliminates the undesirable vibratory characteristic.

In various embodiments, the method further comprises generating a first model with the first inspected IBR and the second inspected IBR based on measured data from an IBR inspection system. The first model may be a computational fluid dynamics model.

In various embodiments, the method further comprises performing a computation fluid dynamics analysis prior to performing the vibratory analysis. In various embodiments, the method further comprises determining boundary conditions of the vibratory analysis based at least in part on the computation fluid dynamics analysis.

In various embodiments, the method further comprises scaling vibratory stress data from the vibratory analysis based on test engine data.

In various embodiments, the undesirable vibratory characteristic is a vibratory stress that exceeds a vibratory stress threshold for the second inspected IBR.

In various embodiments, the selected repair shape includes a first blend shape that is larger than a second blend shape, the second blend shape determined from performing a second vibratory analysis for only the first IBR.

An article of manufacture is disclosed herein. The article of manufacture may include a tangible, non-transitory computer-readable storage medium having instructions stored thereon that, in response to execution by a processor, cause the processor to perform operations comprising: receiving, via the processor, one of a point cloud and a three-dimensional model for an inspected integrally bladed rotor (IBR) and a defect including a defect shape, a defect size, and a defect location; iterating, via the processor, a repaired defect shape associated with a repair process based on a vibratory analysis of a stack of inspected IBRs; and determining, via the processor, a final repair shape for the defect based on a predicted vibratory impact on a second inspected IBR in the stack of inspected IBRs.

In various embodiments, the predicted vibratory impact is reducing an estimated vibratory stress in the second inspected IBR from above a vibratory stress threshold to below the vibratory stress threshold.

In various embodiments, the operations further comprise performing a computation fluid dynamic analysis of the stack of inspected IBRs prior to iterating the repaired defect shape. In various embodiments, a boundary condition for the vibratory analysis is based at least in part on a result of the computational fluid dynamics analysis.

In various embodiments, the repaired defect shape is outside of a tolerance for a product definition of a designed IBR associated with the inspected IBR.

In various embodiments, a predicted vibratory stress in the second inspected IBR is greater than a vibratory stress threshold in response to performing a second vibratory analysis at an IBR level. In various embodiments, a second predicted vibratory stress in the second inspected IBR is less than the vibratory stress threshold in response to performing the vibratory analysis with the stack of inspected IBRs.

A system is disclosed herein. The system may comprise: a support structure; a scanner moveably coupled to the support structure; at least one of an additive component or a subtractive component moveably coupled to the support structure; and a controller in electronic communication with the scanner and at least one of the additive component or the subtractive component, the controller configured to: receive from the scanner, a point cloud of an integrally bladed rotor (IBR); transmit the point cloud to an analysis system; and receive from the analysis system a repair shape for a defect of the IBR, the repair shape based on modifying a predicted vibratory characteristic of a second IBR in a stack of inspected IBRs, the stack of inspected IBRs being simulated by the analysis system.

In various embodiments, the controller is further configured to command one of the additive component or the subtractive component to generate the repair shape for the defect of the IBR.

In various embodiments, the predicted vibratory characteristic is a predicted vibratory stress. In various embodiments, the predicted vibratory stress is reduced from a first predicted vibratory stress that is above a vibratory stress threshold to a second predicted vibratory stress that is below the vibratory stress threshold in response to the repair shape.

In various embodiments, the system further comprises the analysis system.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1A:
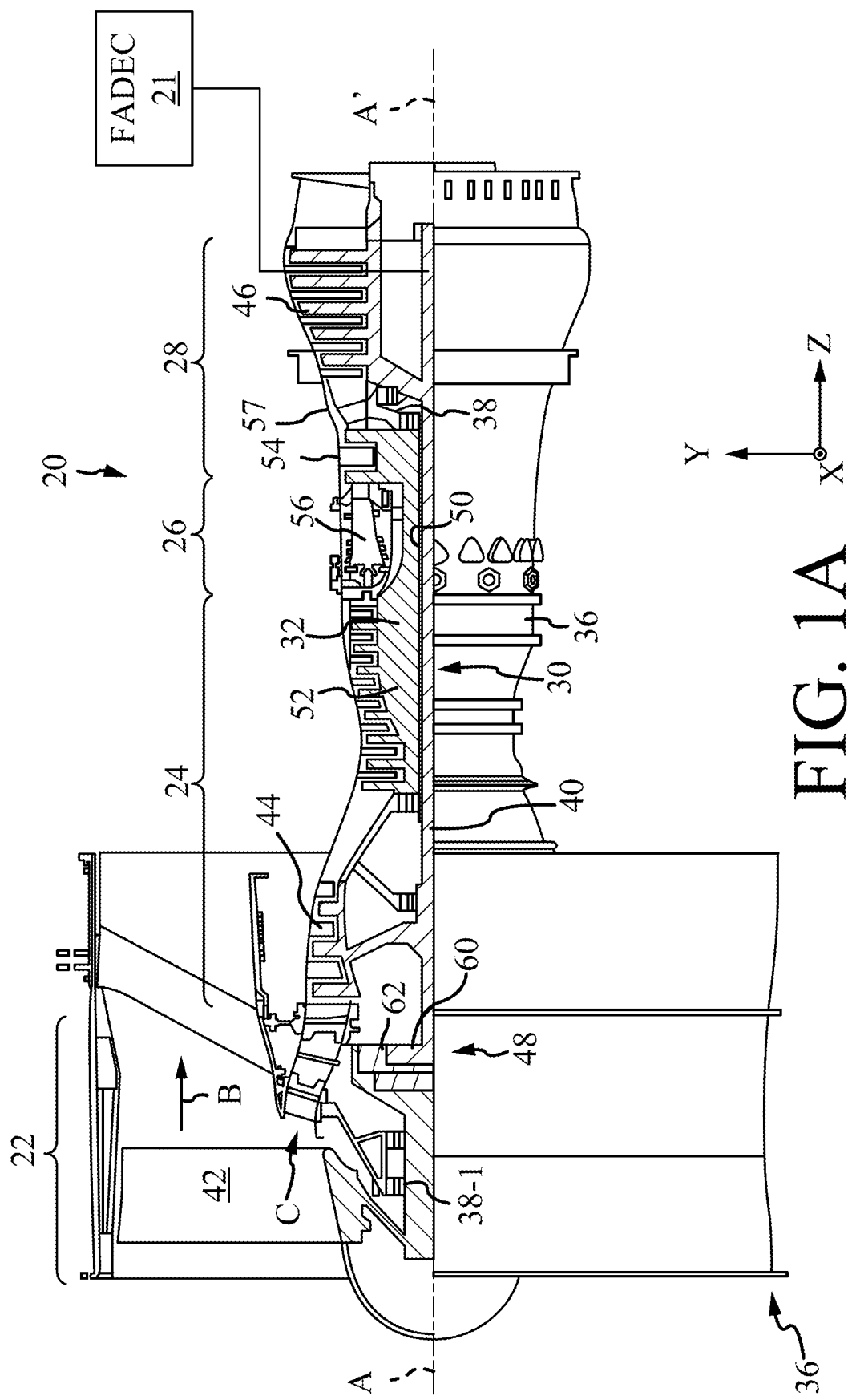
FIG. 1A illustrates a cross-sectional view of a gas-turbine engine, in accordance with various embodiments.

With reference to FIG. 1A, a gas turbine engine 20 is shown according to various embodiments. Gas turbine engine 20 may be a two-spool turbofan that generally incorporates a fan section 22, a compressor section 24, a combustor section 26 and a turbine section 28. In operation, fan section 22 can drive air along a path of bypass airflow B while compressor section 24 can drive air along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures, single spool architecture or the like.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, etc. Engine central longitudinal axis A-A' is oriented in the Z direction on the provided X-Y-Z axes. It should be understood that various bearing systems 38 at various locations may alternatively or additionally be provided, including for example, bearing system 38, bearing system 38-1, etc.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, the gas turbine engine 20 further comprises a Full-Authority Digital Engine Control (FADEC) system 21. The FADEC system 21 includes one or more processors and one or more tangible, non-transitory memories configured to implement digital or programmatic logic. In various embodiments, the FADEC is configured to control the gas turbine engine 20 (i.e., a load system of the gas turbine engine). In various embodiments, the FADEC can control a rotor speed of the low pressure compressor 44, the high pressure compressor 52, or the like.

Figure 1B:
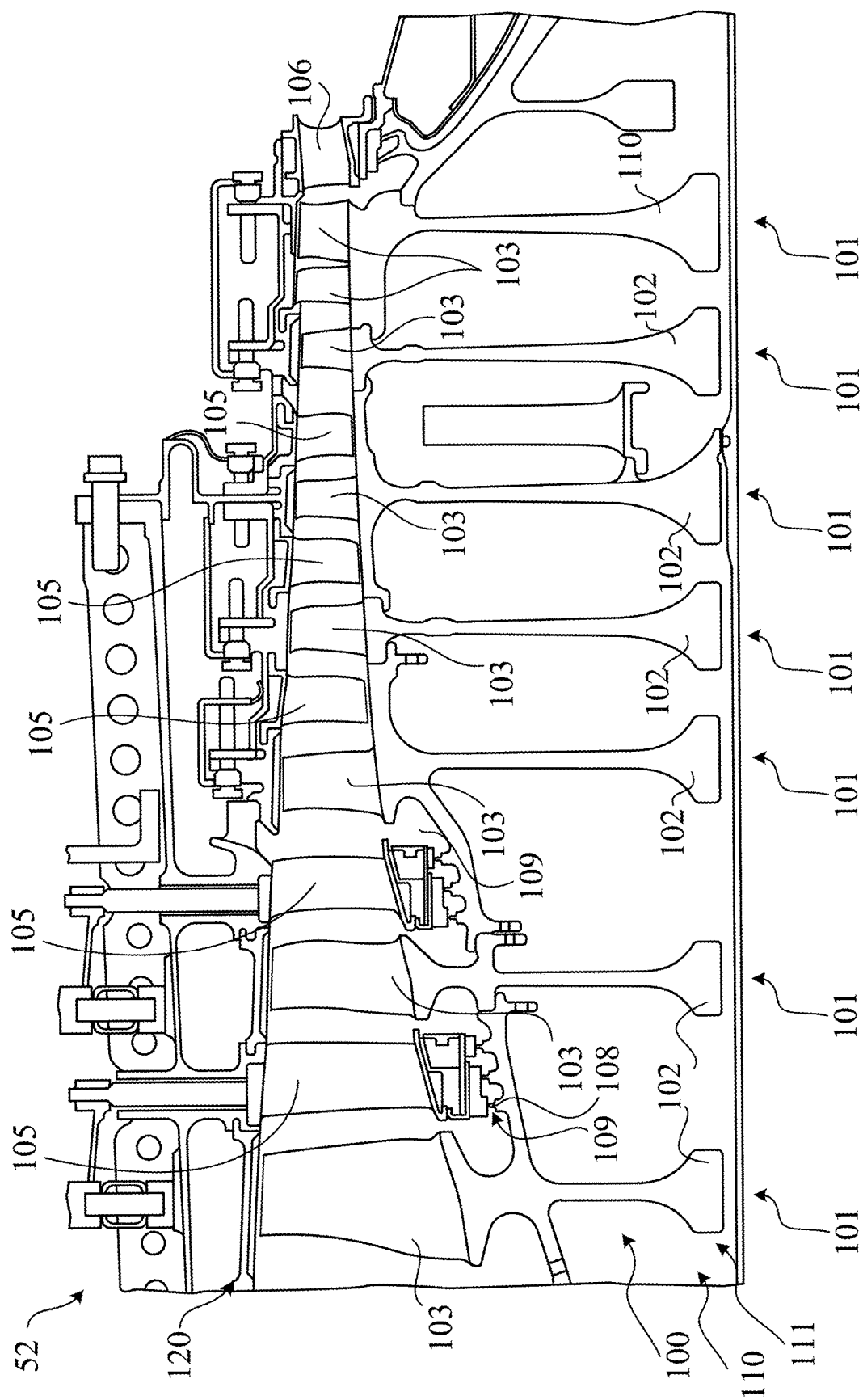
FIG. 1B illustrates a cross-sectional view of a high pressure compressor, in accordance with various embodiments.

In various embodiments, and with reference to FIG. 1B, high pressure compressor 52 of the compressor section 24 of gas turbine engine 20 is provided. The high pressure compressor 52 includes a plurality of blade stages 101 (i.e., rotor stages) and a plurality of vane stages 105 (i.e., stator stages). The blade stages 101 may each include an integrally bladed rotor ("IBR") 100, such that the blades 103 and rotor disks 102 are formed from a single integral component (i.e., a monolithic component formed of a single piece). The blades 103 extend radially outward from the rotor disk 102. The gas turbine engine 20 may further include an exit guide vane stage 106 that defines the aft end of the high pressure compressor 52. Although illustrated with respect to high pressure compressor 52, the present disclosure is not limited in this regard. For example, the low pressure compressor 44 may include a plurality of blade stages 101 and vane stages 105, each blade stage in the plurality of blade stages 101 including the IBR 100 and still be within the scope of this disclosure. In various embodiments, the plurality of blade stages 101 forms a stack of IBRs 110, which define, at least partially, a rotor module 111 of the high pressure compressor 52 of the gas turbine engine 20.

Throughout a flight cycle of an aircraft with the gas turbine engine 20, a rotor speed of the high pressure compressor 52 may be varied with a range of rotor speeds from 0 up to a maximum rotor speed. The operating range for the rotor may be correlated to a frequency range exposed to the rotor during operation. For example, for a maximum rotor speed of 25,000 revolutions per minute (RPMs), a frequency range driven by the rotor may be between 0 Hz and 417 Hz (e.g., 25,000 revolutions per minute/60 minutes per second=417 revolutions per second).

Ideally, each blade 103 for an IBR 100 in a stack of IBRs 110 vibrates the same as an adjacent blade 103 for the IBR 100 in the stack of IBRs 110. However, due to tolerances, wear, damage, etc., each blade 103 for an IBR 100 may have a different vibratory response during operation relative to an adjacent blade 103 for the IBR 100. Furthermore, the vibratory response for each blade 103 of the IBR 100 may differ from a testing environment (i.e., when only the IBR 100 is being tested) relative to an engine environment (i.e., when the IBR 100 is installed with a stack of IBRs 110 on the gas turbine engine 20). In this regard, testing of a single IBR 100 in a stack of IBRs 110 without the adjacent components may provide inaccurate vibratory response data relative to what the IBR 100 would experience during engine operation.

Disclosed herein is a process for determining a repair shape for a defect of an IBR based on analyzing a stack of inspected IBRs (e.g., stack of IBRs 110) via finite element analysis (FEA) and/or finite element modeling (FEM) of the rotor module with the inspected IBRs (in contrast with IBRs having nominal dimensions according to a product definition of the IBR). In this regard, vibratory responses of adjacent IBRs 100 in the stack of IBRs 110 may be factored into a vibratory analysis for an inspected IBR 100 as described further herein.

Figure 2A:
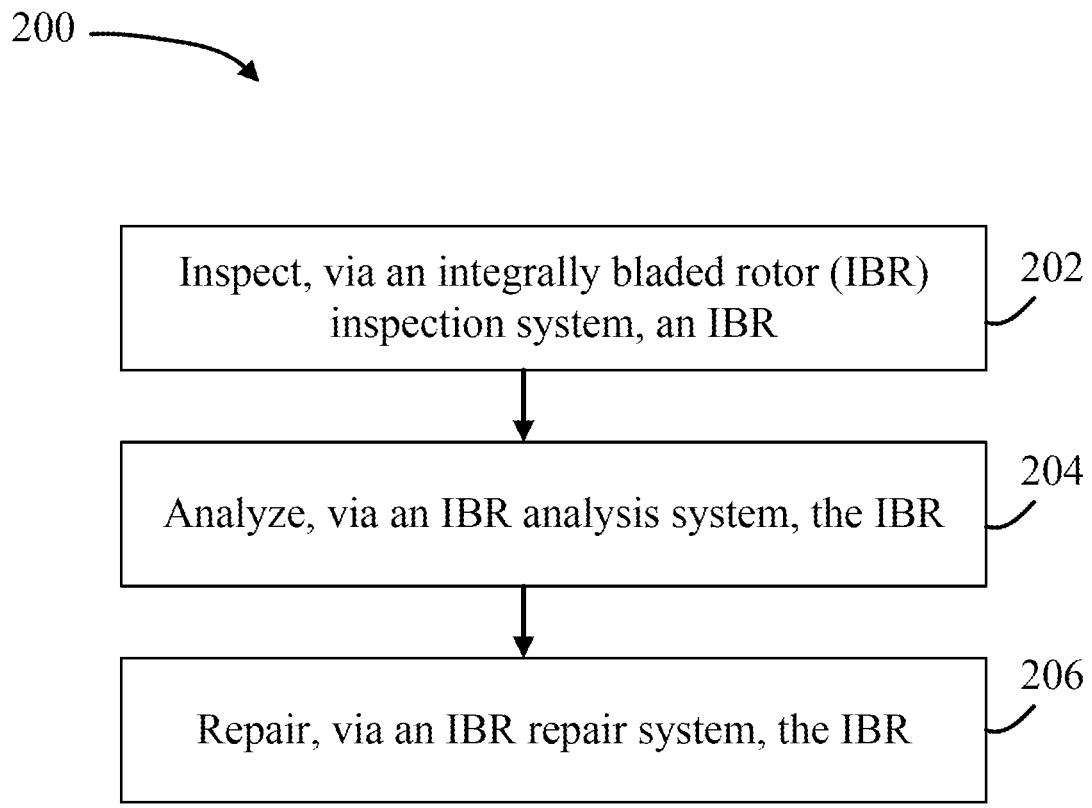
FIG. 2A illustrates a repair process for an integrally bladed rotor, in accordance with various embodiments.

Referring now to FIG. 2A, a method 200 for repairing an IBR 100 from FIG. 1B from a compressor section (e.g., compressor section 24) of a gas turbine engine 20 from FIG. 1A is illustrated, in accordance with various embodiments. For example, after a predetermined number of flight cycles, or due to an unscheduled maintenance, a gas turbine engine 20 from FIG. 1A is in operation, the method 200 may be performed for one or more of IBR 100 in the compressor section 24 of the gas turbine engine 20. In various embodiments, method 200 may be performed for IBRs 100 from several gas turbine engines (e.g., in accordance with gas turbine engine 20), which may facilitate various potential repair options as described further herein.

The method 200 comprises inspecting, via an IBR inspection system, an IBR 100 (step 202). As described further herein, step 202 may be performed for numerous IBRs 100 prior to proceeding to step 204. In various embodiments, step 202 may be performed for a single IBR 100 prior to proceeding to step 204. The present disclosure is not limited in this regard.

In various embodiments, inspecting the IBR comprises scanning, via the IBR inspection system, the IBR 100. In this regard, the IBR inspection system may comprise an optical scanner (e.g., structured light scanners, such as white light scanners, structured blue light scanners, or the like) and/or a coordinate-measuring machine. The present disclosure is not limited in this regard. In response to scanning the IBR 100, a digital representation of the IBR 100 (e.g., a point cloud, a surface model, or the like) is received by a controller and converted to a three-dimensional model (e.g., a computer Aided Design (CAD) model or Finite Element Model (FEM)). The three-dimensional model may be utilized for analyzing the IBR 100 in step 204 of method 200. In various embodiments, to analyze mistuning of the IBR 100, the three-dimensional model is converted to a FEM to perform a modal analysis or the like.

The method 200 further comprises analyzing, via an IBR analysis system, the IBR (step 204). In various embodiments, by inspecting a plurality of IBRs in step 202, a system level analysis of various repair options may be performed in step 204. For example, the three-dimensional model produced from step 202 may be used as an input for blade level analysis (e.g., low-cycle fatigue, high cycle fatigue, Goodman diagram analysis, frequency, modal assurance criterion, etc.), stage level analysis (e.g., mistuning, aerodynamic performance, fatigue, imbalance, solidity, area and speed rotor sizing, etc.), and/or module level analysis (e.g., aerodynamic performance, compressor stack stiffness, clocking, clearances, axial gapping, imbalance, secondary flow influence, etc.). In this regard, by generating a three-dimensional model via step 202 outlined above, various forms of analysis may be performed to generate an optimal repair configuration (e.g., optimized for aerodynamic performance, optimized for cost of repair, optimized to prevent mistuning, etc.).

The optimal repair configuration may be for an airfoil of a respective IBR 100, for the respective IBR 100 as a whole, or for stack of IBRs 110 from FIG. 1B. In various embodiments, the optimal repair configuration for the respective IBR 100 is based on ensuring the IBR 100 is sufficiently tuned (i.e., by having estimated stresses that are less than a threshold stress for each vibratory mode within a frequency range associated with an operating range of the gas turbine engine 20). In this regard, as described further herein, a potential repair shape of a defect on the IBR 100 may be modified (or iterated) digitally in the FEM until an optimal repair for a sufficiently tuned IBR 100 is determined. In this regard, the potential repair shape (or potential repair shapes) may include modifying (or blending) portions of the IBR 100 that are not damaged, adding material (e.g., via additive manufacturing or patches) to the IBR 100, blending or adding material to another IBR in a stack of inspected IBRs, or the like. The present disclosure is not limited in this regard.

The method 200 further comprises repairing, via an IBR repair system, the IBR (step 206). In various embodiments, an optimal repair model may be generated from the analyzing step 204 of method 200. In various embodiments, a plurality of repair models may be generated based on various factors. For example, a repair shape on the inspected IBR may be based on another IBR in the stack of IBRs being mistuned. In this regard, the repair shape for the inspected IBR may result in the mistuned IBR being sufficiently tuned, in accordance with various embodiments. In this regard, a repair process (and associated repair shape) may be determined based on the analyzing step 204. In various embodiments, the repair performed in step 206 may be a partial repair. For example, in the analyzing step 204, it may be determined that partially repairing a defect results in a better tuned IBR (i.e., lower vibratory stresses or the like).

Figure 2B:
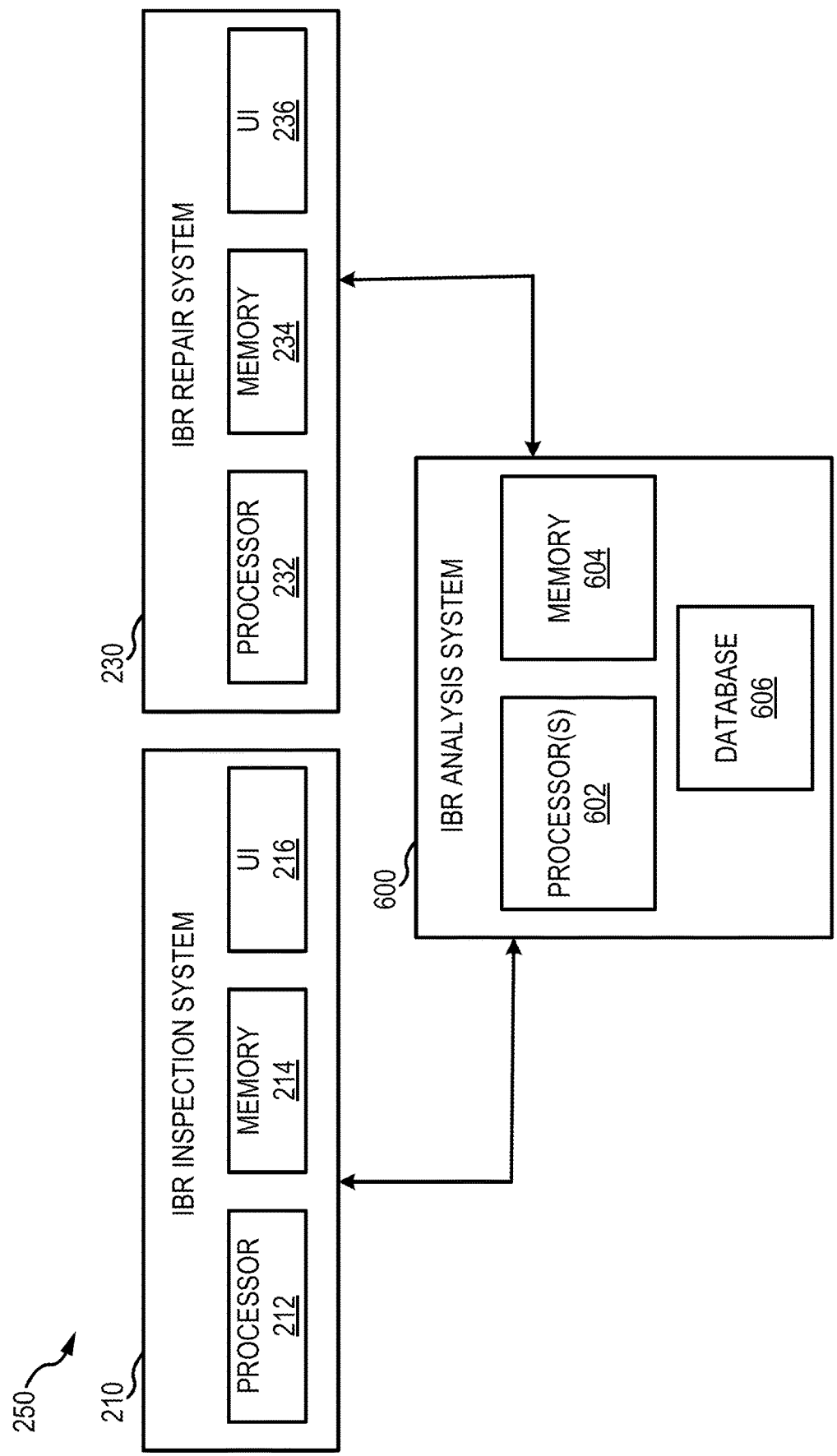
FIG. 2B illustrates a schematic view of a system for repairing an integrally bladed rotor, in accordance with various embodiments.

Referring now to FIG. 2B, a system 250 for repairing an IBR 100 is illustrated, in accordance with various embodiments. In various embodiments, the system 250 includes an IBR inspection system 210, an IBR analysis system 600, and an IBR repair system 230. Although illustrated as separate systems with separate processors (e.g., processors 212, 602, 232), the present disclosure is not limited in this regard. For example, the system 250 may include a single processor, a single memory, and a single user interface and still remain within the scope of this disclosure.

Similarly, although IBR inspection system 210 and IBR repair system 230 are illustrated as separate systems with separate processors, memories and user interfaces, the present disclosure is not limited in this regard. For example, the IBR inspection system 210 and the IBR repair system 230 may be combined into a single system that communicates with the IBR analysis system 600, in accordance with various embodiments.

In various embodiments, the IBR analysis system 600 may include one or more processors 602. The IBR analysis system 600 may be configured to process a significant amount of data during the analysis step 204 from method 200. In this regard, the IBR analysis system 600 may be configured for remote computing (e.g., cloud-based computing), or the like. Thus, a processing time and a volume of data analyzed may be greatly increased relative to typical repair systems, in accordance with various embodiments.

In various embodiments, the IBR inspection system 210, the IBR analysis system 600, and the IBR repair system 230 each include a computer system comprising a processor (e.g., processor 212, processor(s) 602, and/or processor 232) and a memory (e.g., memory 214, memory 604, memory 234). The IBR inspection system 210 and the IBR repair system 230 may each comprise a user interface (UI) (e.g., UI 216, UI 236). In various embodiments, the IBR inspection system 210 and the IBR repair system 230 may utilize a single user interface to control both systems. The present disclosure is not limited in this regard.

The IBR analysis system 600 may further comprise a database 606. In various embodiments, the database 606 comprises various stored data for use in the IBR analysis system 600. The database 606 may include an inspected IBR database (e.g., with data from various prior inspected IBRs), a repair data database (e.g., with data from various prior repairs performed/approved), a load data database (e.g., with engine load data from structural and/or aerodynamic analysis), a test data database (e.g., with engine specific test data used for validation of structural and/or aerodynamic analysis), a design data database (e.g., with design models having nominal dimensions according to a product definition of the IBR 100), and/or a material data database (e.g., with material for each component utilized in an analysis step 204 of method 200), in accordance with various embodiments.

System 250 may be configured for inspecting (e.g., step 202 of method 200), analyzing (e.g., step 204 of method 200), and repairing (e.g., step 206 of method 200) an IBR 100, in accordance with various embodiments. In this regard, a repair process for an IBR 100 may be fully automated, or nearly fully automated, in accordance with various embodiments, as described further herein.

In various embodiments, systems 210, 600, 230 may each store a software program configured to perform the methods described herein in a respective memory 214, 604, 234 and run the software program using the respective processor 212, 602, 232. The systems 210, 600, 230 may include any number of individual processors 212, 602, 232 and memories 214, 604, 234. Various data may be communicated between the systems 210, 600, 230 and a user via the user interfaces (e.g., UI 216, UI 236). Such information may also be communicated between the systems 210, 600, 230 and external devices, database 606, and/or any other computing device connected to the systems 210, 600, 230 (e.g., through any network such as a local area network (LAN), or wide area network (WAN) such as the Internet).

In various embodiments, for systems 210, 600, 230 depicted in FIG. 2B, each processor 212, 602, 232 may retrieve and executes instructions stored in the respective memory 214, 604, 234 to control the operation of the respective system 210, 600, 230. Any number and type of processor(s) (e.g., an integrated circuit microprocessor, microcontroller, and/or digital signal processor (DSP)), can be used in conjunction with the various embodiments. The processor 212, 602, 232 may include, and/or operate in conjunction with, any other suitable components and features, such as comparators, analog-to-digital converters (ADCs), and/or digital-to-analog converters (DACs). Functionality of various embodiments may also be implemented through various hardware components storing machine-readable instructions, such as application-specific integrated circuits (ASICs), field-programmable gate arrays (FPGAs) and/or complex programmable logic devices (CPLDs).

The memory 214, 604, 234 may include a non-transitory computer-readable medium (such as on a CD-ROM, DVD-ROM, hard drive or FLASH memory) storing computer-readable instructions stored thereon that can be executed by the processor 212, 602, 232 to perform the methods of the present disclosure. The memory 144 may include any combination of different memory storage devices, such as hard drives, random access memory (RAM), read only memory (ROM), FLASH memory, or any other type of volatile and/or nonvolatile memory.

The system 210, 230 may receive and display information via a respective user interface (e.g., UI 216 and/or UI 236). The user interfaces (e.g., UI 216 and/or UI 236) include various peripheral output devices (such as monitors and printers), as well as any suitable input or control devices (such as a mouse and keyboard) to allow users to control and interact with the software program.

In various embodiments, IBR inspection system 210 and IBR repair system 230 may each be in electronic communication with IBR analysis system 220, directly or via a respective user interface (e.g., UI 216 and/or UI 236). IBR inspection system 210 and IBR repair system 230 may comprise any suitable hardware, software, and/or database components capable of sending, receiving, and storing data. For example, IBR inspection system 210 and/or IBR repair system 230 may comprise a personal computer, personal digital assistant, cellular phone, smartphone (e.g., those running UNIX-based and/or Linux-based operating systems such as IPHONE®, ANDROID®, and/or the like), IoT device, kiosk, and/or the like. IBR inspection system 210 and/or IBR repair system 230 may comprise an operating system, such as, for example, a WINDOWS® mobile operating system, an ANDROID® operating system, APPLE® IOS®, a LINUX® operating system, and the like. IBR inspection system 210 and/or IBR repair system 230 may also comprise software components installed on IBR inspection system 210 and/or IBR repair system 230 and configured to enable access to various system 250 components. For example, IBR inspection system 210 and/or IBR repair system 230 may comprise a web browser (e.g., MICROSOFT INTERNET EXPLORER®, GOOGLE CHROME®, APPLE SAFARI® etc.), an application, a micro-app or mobile application, or the like, configured to allow the IBR inspection system 210 and/or IBR repair system 230 to access and interact with IBR analysis system 220 (e.g., directly or via a respective UI, as discussed further herein).

Figure 3:
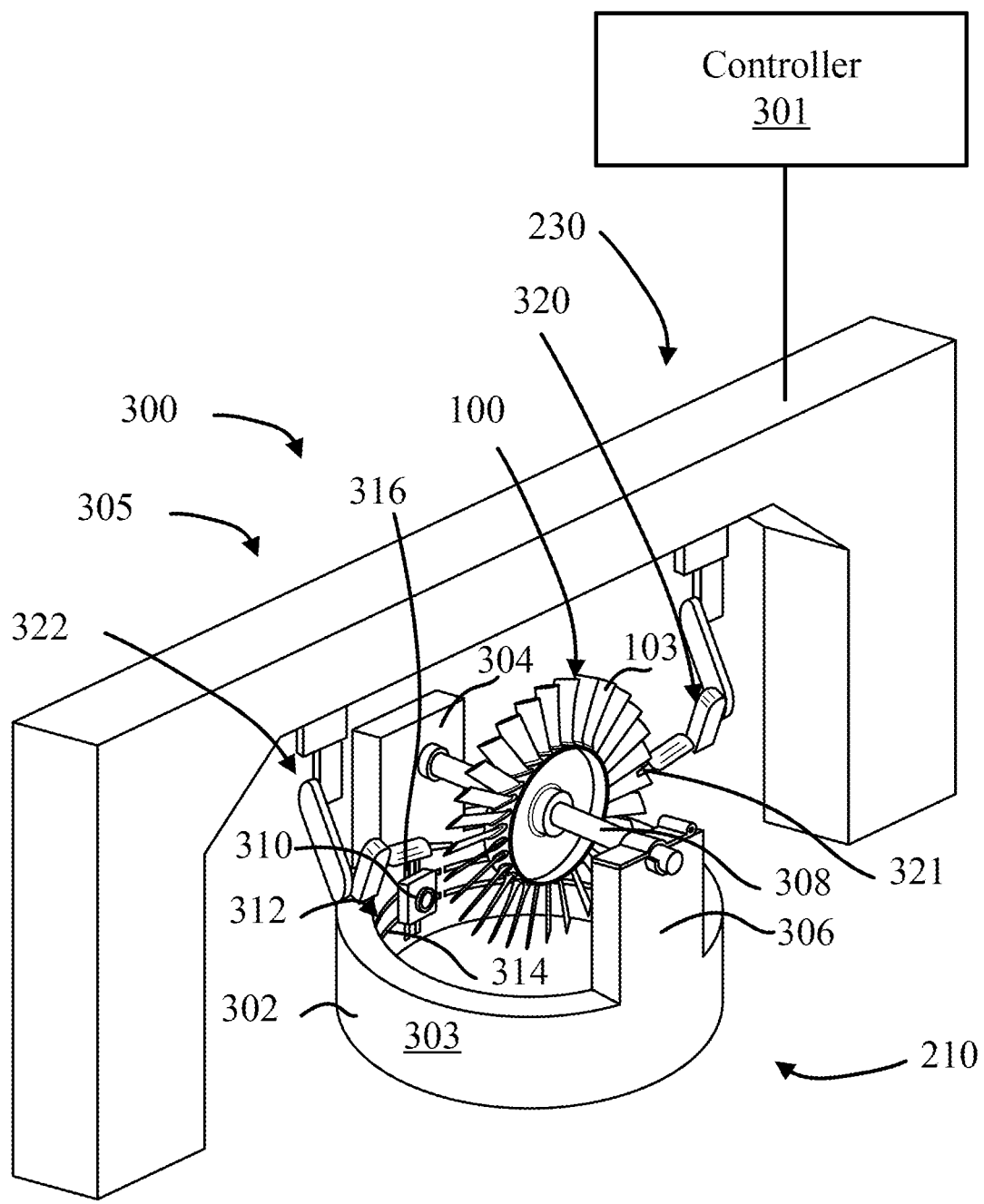
FIG. 3 illustrates a perspective view of a system for bladed rotor inspection and/or repair, in accordance with various embodiments.
Figure 4:
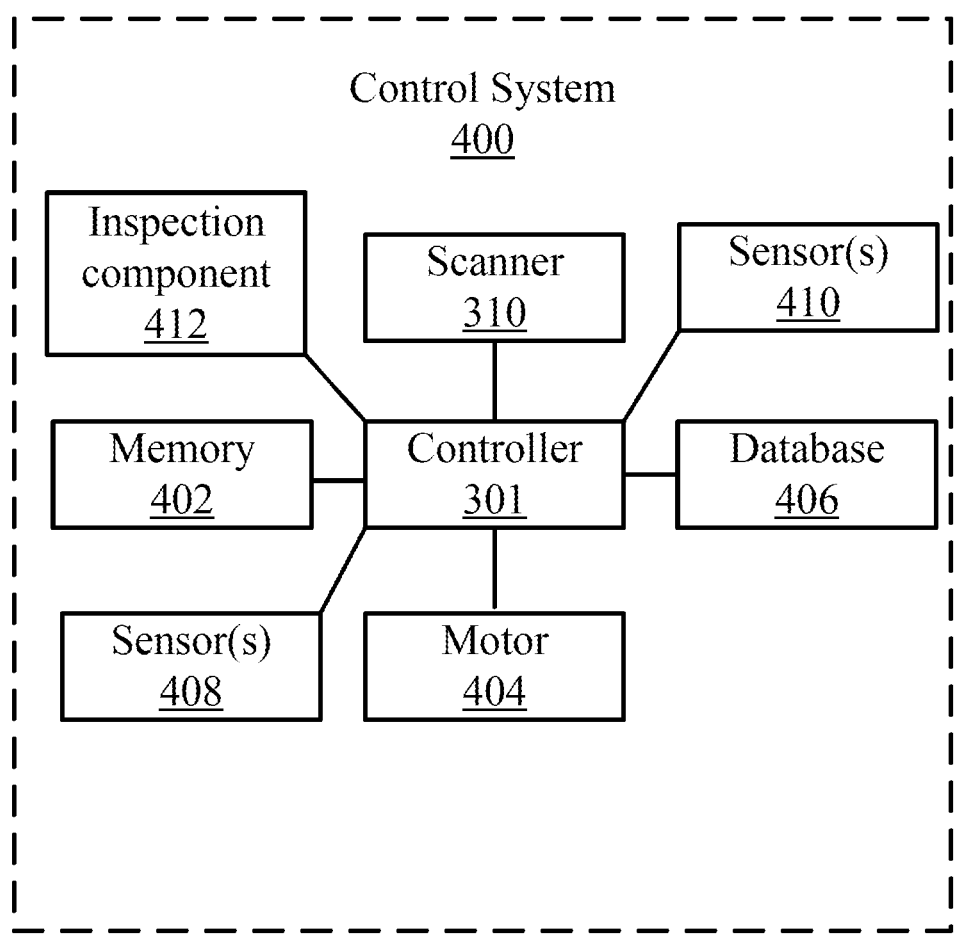
FIG. 4 illustrates a schematic view of a control system for the system of FIG. 3, in accordance with various embodiments.

Referring now to FIGS. 3 and 4, a perspective view of a system 210 for use in an inspection step 202 and/or a repair step 206 of method 200 from FIG. 2 (FIG. 3) and a control system 400 for the inspection system 210 (FIG. 4) are illustrated in accordance with various embodiments. In various embodiments, the system 210 comprises a repair system 230 and an inspection system 210. For example, various components of the system 210 may be configured to inspect the IBR 100 and generate a digital map of the IBR 100 (e.g., a point cloud), the system 210 may be configured to transmit the digital map to an analysis system (e.g., analysis system 600), the system 210 may then receive the results from the analysis system 600, and/or perform a repair based on a determination from the analysis system 600, in accordance with various embodiments.

The system 210 comprises a controller 301, a support structure 302, a shaft 308, and a scanner 310. In various embodiments, the control system 400 comprises the controller 301, the scanner 310, a memory 402, a motor 404, a database 406, and sensor(s) 408, sensor(s) 410, and inspection component 412. In various embodiments, the system 210 comprises a device 305 configured for bladed rotor repair and/or bladed rotor inspection.

In various embodiments, the support structure 302 comprises a base 303, a first vertical support 304, a second vertical support 306. In various embodiments, the base 303 may be annular in shape. Although illustrated as being annular, the present disclosure is not limited in this regard. For example, the base 303 may be semi-annular in shape, a flat plate, or the like. In various embodiments, the vertical supports 304, 306 extend vertically upward from the base 303 on opposite sides of the base (e.g., 180 degrees apart, or opposite sides if the base 303 where a square plate). The shaft 308 extends from the first vertical support 304 to the second vertical support 306. The shaft 308 may be rotatably coupled to the motor 404, which may be disposed within the first vertical support 304, in accordance with various embodiments. The shaft 308 may be restrained vertically and horizontally at the second vertical support 306 but free to rotate relative to the second vertical support about a central longitudinal axis of the shaft 308. In various embodiments, a bearing assembly may be coupled to the second vertical support 306 to facilitate rotation of the shaft, in accordance with various embodiments.

In various embodiments, the IBR 100 to be inspected in accordance with the inspection step 202 of the method 200 via the inspection system 210 may be coupled to the shaft 308 (e.g., via a rigid coupling, or the like). The present disclosure is not limited in this regard, and the shaft 308 may be coupled to the IBR 100 to be inspected by any method known in the art and be within the scope of this disclosure.

In various embodiments, the scanner 310 is operably coupled to a track system 312. In various embodiments, the track system 312 may comprise a curved track 314 and a vertical track 316. The vertical track 316 may slidingly couple to the vertical track 316 (e.g., via rollers or the like). The scanner 310 may be slidingly coupled to the vertical track 316 (e.g., via a conveyor belt, linkages, or the like). In various embodiments, the scanner 310 is configured to extend from the track system 312 towards the IBR 100 during inspection of the IBR 100 in accordance with step 202 of method 200. In this regard, the inspection system 210 may further comprise a robot arm (e.g., robot arm 322), an actuator (e.g., in combination with the track system 312) or the like. Although described herein with tracks 314, 316, and a robot arm 322 and/or an actuator of track system 312, the present disclosure is not limited in this regard. For example, any electronically controlled (e.g., wireless or wired) component configured to move the scanner 310, a machining tool (e.g., a mill, a cutter, a lathe, etc.), an additive manufacturing tool (e.g., an auger, a DED laser, etc.), or the like in six degrees of freedom relative to the IBR 100 is within the scope of this disclosure.

In various embodiments, the inspection component 412 comprises rollers for the curved track, a conveyor belt for the vertical track, and/or a robotic arm coupled to the scanner 310. In various embodiments, the inspection component 412 comprises only a robotic arm. (e.g., a robotic arm 322). In various embodiments, the inspection component 412 comprises only the rollers for the curved track 314 and the conveyor belt or linkages for the vertical track 316. The present disclosure is not limited in this regard. In various embodiments, the inspection component 412 is stationary and the IBR 100 being inspected is moveable along three-axis, five-axis, or the like. The present disclosure is not limited in this regard.

In various embodiments, the scanner 310 comprises a coordinate measuring machine (CMM), a mechanical scanner, a laser scanner, a structured scanner (e.g., a white light scanner, a blue light scanner, etc.), a non-structured optical scanner, a non-visual scanner (e.g., computed tomography), or the like. In various embodiments, the scanner 310 is a blue light scanner. In various embodiments, the scanner 310 may be swapped with another scanner at any point during an inspection step 202 as described further herein. In various embodiments, the inspection system 210 may be configured to swap the scanner 310 with a different scanner during the inspection step 202 of method 200 as described further herein.

A "blue light scanner" as disclosed herein refers to a non-contact structure light scanner. The blue light scanner may have a scan range of between $100 \times 75$ mm$^2$–$400 \times 300$ mm$^2$, in accordance with various embodiments. In various embodiments, an accuracy of the blue light scanner may be between 0.005 and 0.015 mm. In various embodiments, the blue light scanner be able to determine distances between adjacent points in the point cloud of between 0.04 and 0.16 mm as measured across three axes. In various embodiments, a volume accuracy of the blue light scanner may be approximately 0.8 mm/m. In various embodiments, a scan depth may be between approximately 100 and 400 mm. In various embodiments, the blue light scanner may comprise a light source including a blue LED. In this regard, the blue light scanner may be configured to emit an average wavelength between 400 and 450 nm, in accordance with various embodiments. Although described with various specifications herein, the blue light scanner is not limited in this regard, and one skilled in the art may recognize the parameters of the blue light scanner may extend outside the exemplary ranges. Use of a blue light scanner provides a high resolution point cloud for a three dimensional object.

In various embodiments, the system 210 further comprises a control arm 320 of the repair system 320. In various embodiments the control arm 320 comprises a tool holder 321. The tool holder 321 is configured to couple to a subtractive component 322 (e.g., a mill, a lathe, a cutter, etc.). In various embodiments, the control arm 322 of system 210 may be a control arm for the repair system 320 as well. In various embodiments, the control arms 320, 322 may be used in both the repair system 230 and the inspection system 210. The present disclosure is not limited in this regard.

The controller 301 may be integrated into computer system of the system 210 (e.g., in processor 212 and/or memory 214 from FIG. 2B). In various embodiments, the controller 301 may be configured as a central network element or hub to various systems and components of the control system 400. In various embodiments, controller 301 may comprise a processor (e.g., processor 212). In various embodiments, controller 301 may be implemented as a single controller (e.g., via a single processor 212 and associated memory 214). In various embodiments, controller 301 may be implemented as multiple processors (e.g., a main processor and local processors for various components). The controller 301 can be a general purpose processor, a digital signal processor (DSP), an application specific integrated circuit (ASIC), a field programmable gate array (FPGA) or other programmable logic device, discrete gate or transistor logic, discrete hardware components, or any combination thereof. The controller 301 may comprise a processor configured to implement various logical operations in response to execution of instructions, for example, instructions stored on a non-transitory, tangible, computer-readable medium configured to communicate with the controller 301.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the motor 404 of the control system 400 is operably coupled to the shaft 308 of the control system 400. In various embodiments, the motor 404 may comprise a direct current (DC) stepper, an alternating current (AC) motor or the like. The present disclosure is not limited in this regard. In various embodiments, the sensor(s) 408 include Hall effect sensor(s), optical sensor(s), resolver(s), or the like. In various embodiments, sensor(s) 408 may include sensor(s) configured to detect an angular position of the shaft 308 during an inspection step for an IBR 100 (e.g., step 202 from method 200). In this regard, during inspection of the IBR 100, the controller 301 receives sensor data from the sensor(s) 408. The controller 301 can utilize the sensor data received from the sensor(s) 408 to correlate an angular position of the IBR 100 being inspected with a location of the scanner 310 as described further herein. In various embodiments, the IBR 100 may remain stationary throughout an inspection process (e.g., inspection step 202 of method 200) and only a control arm (e.g., control arm 320 and/or control arm 322) may move. Thus, coordinates of the control arm(s) may be determined via sensor(s) 408 in a similar manner to orient and construct the IBR 100 being inspected.

In various embodiments, the sensor(s) 410 are configured to detect a position of the scanner 310 during the inspection step 202 of method 200. In this regard, sensor(s) 410 may be position sensors (e.g., capacitive displacement sensors, eddy-current sensors, Hall effect sensors, inductive sensors, optical sensors, linear variable differential transformer (LVDT) sensors, photodiode array sensors, piezoelectric sensors, encoders, potentiometer sensors, ultrasonic sensors or the like). The present disclosure is not limited in this regard. Thus, during inspection of the IBR 100 in accordance with step 202 of method 200, controller 301 is able to determine a location of the scanner 310 and an angular position of the IBR 100 throughout the inspection. Thus, based on the location of the scanner 310, an angular location of the IBR 100 and scanning data received from the scanner 310, a digital map (e.g., a robust point cloud) can be generated during the inspection step 202 of method 200 for the IBR 100 being inspected. In various embodiments, the point cloud encompasses the entire IBR 100 (e.g., between 95% and 100% of a surface area of the IBR 100, or between 99% and 100% of the surface area of the IBR 100).

Figure 5:
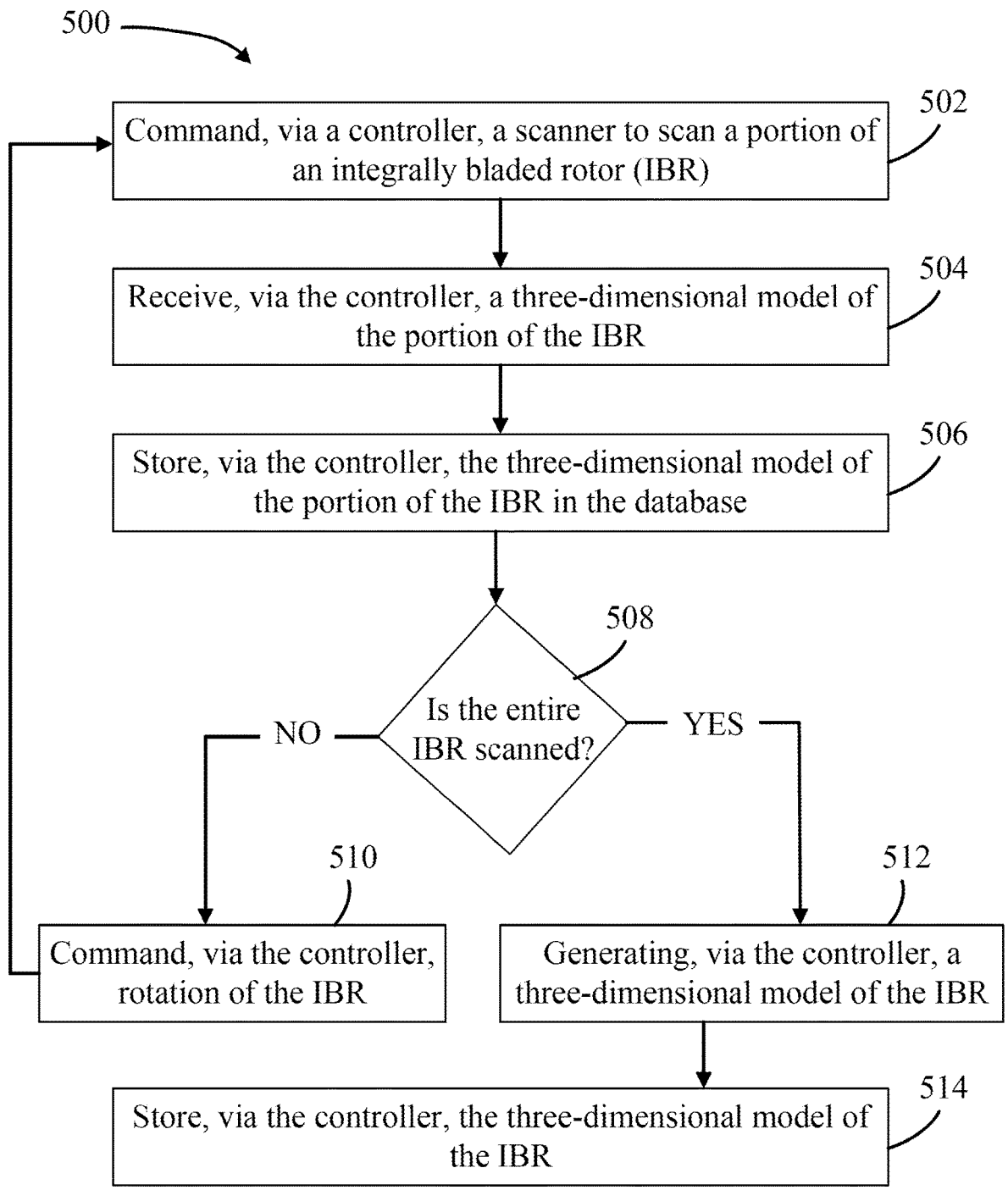
FIG. 5 illustrates a process performed by a control system for an integrally bladed rotor inspection system, in accordance with various embodiments.

Referring now to FIG. 5, a process 500 for inspecting an IBR 100 that is performed by the control system 400 of the inspection system 210 is illustrated, in accordance with various embodiments. In various embodiments, the process 500 comprises commanding, via a controller 301, a scanner to scan a portion of the IBR 100 (step 502). In various embodiments, the portion of the IBR 100 may comprise a blade 103 or the like. In various embodiments, a root, a platform, or the like of the IBR 100 may be the portion. The present disclosure is not limited in this regard. In various embodiments, the root and the platform of the IBR 100 may be scanned along with the blade 103. In various embodiments, multiple blades 101 may be scanned with the portion of the IBR 100.

In various embodiments, commanding the scanner 310 in step 502 may further comprise commanding rollers of the curved track 314, commanding a conveyor belt or linkages of the vertical track 316 or the like in conjunction with scanning via the scanner 310. In this regard, the controller 301 may provide a predetermined path for the scanner 310 to scan the portion of the IBR 100, in accordance with various embodiments. However, the present disclosure is not limited in this regard, for example, step 502 may include commanding a scanner coupled to a control arm (e.g., control arm 320 or control arm 322) to scan a portion of the IBR 100, or may include commanding a five-axis system to orient the IBR 100 for scanning, or the like. Thus, step 502 may include any command to position the IBR 100 being inspected relative to a scanner and scanning the portion of the IBR 100, in accordance with various embodiments.

The process 500 further comprises receiving, via the controller, a three-dimensional model of the first portion of the IBR 100 (step 504). In various embodiments, the three-dimensional model is a digital map (e.g., a point cloud). In this regard, in response to utilizing a CMM scanner or a structured light scanner, the scanner 310 measures discrete points of surfaces of the portion of the IBR being scanned and transmits the discrete points to the controller 301. In various embodiments, the point cloud may be relative to a datum defined by the inspection system 210. For example, the shaft 308 may be configured to couple to the IBR 100 being inspected in exactly the same place every time. In this regard, a datum for the inspection system 210 may be defined in the memory (e.g., memory 214). In various embodiments, the datum is a center point of the IBR 100 (e.g., a center point of the disk of the IBR 100). Thus, the controller 301 is configured to determine a location of each point scanned via the scanner 310 based on the datum, a location of the scanner 310 when a scan occurs during step 502 from sensor(s) 410, measurement data from the scanner 310, and an angular position of the IBR 100 from sensor(s) 408.

The process 500 further comprises storing, via the controller 301, the three-dimensional model in a database 406 (step 506). Although described herein as intermittently storing scanned portions of the IBR 100, the present disclosure is not limited in this regard. For example, the scanner 310 may scan the entire IBR prior to transmitting the three-dimensional model to the controller 301 and still be within the scope of this disclosure. In this regard, the controller 301 may be configured to determine an amount of the IBR 100 that has been scanned based on the angular position of the IBR 100 and the position of the scanner 310 throughout step 502.

The process 500 further comprises determining whether the IBR has been scanned in its entirety (e.g., between 95% and 100% or between 99% and 100% or approximately 100%). In this regard, the process 500 may determine whether the scanner 310 has performed a scan at each predetermined arc angle (e.g., 1 degree, 3 degrees, 5 degrees, or the like) and a total angular rotation of the IBR 100 for the scanning process has reached 360 degrees. In various embodiments, depending on a specific analysis, the entire IBR may correspond to an entirety of the blades 101 (e.g., between 95% and 100% or between 99% and 100% or approximately 100% of the blades 101 of an IBR 100). The present disclosure is not limited in this regard.

If the entire IBR has not been scanned, the process 500 further comprises commanding, via the controller 301, rotation of the IBR 100 a fixed amount (e.g., 1 degree, 3 degrees, 5 degrees, 10 degrees, etc.) (step 510). The present disclosure is not limited in this regard. The controller 301 may command the motor 404 to rotate the IBR 100 the fixed amount, in accordance with various embodiments.

In various embodiments, steps 502, 504, 506, 508 are repeated until the entire IBR is scanned according to step 508, at which point the process 500 further comprises generating, via the controller 301, a three-dimensional model of the IBR 100 (step 512). In this regard, in response to the scanner 310 being a CMM scanner or a structured light scanner, the controller 301 may stitch together the point clouds for each portion of the IBR scanned via step 502 to generate a robust point cloud of the entire IBR 100 (e.g., between 95% and 100% of an external surface area of the IBR 100, or between 99% and 100% of the external surface area of the IBR 100, or approximately 100% of the external surface area of the IBR 100). In various embodiments, the entire IBR 100 refers to approximately 100% of an external surface area of all the blades of the IBR 100.

In various embodiments, the process 500 further comprises storing, via the controller 301, the three-dimensional model of the MR in the database 406 (step 514). In this regard, the three-dimensional model may be utilized for analyzing the inspected IBR (e.g., in accordance with step 204 of method 200), determining a repair for the inspected IBR (e.g., based on step 204 of method 200) and/or in repairing the inspected IBR (e.g., in accordance with step 206 of method 200).

In various embodiments, the process 500 may provide a fully automated solution for generating a robust three-dimensional model (e.g., a point cloud) for an inspected IBR 100, in accordance with various embodiments.

Figure 6:
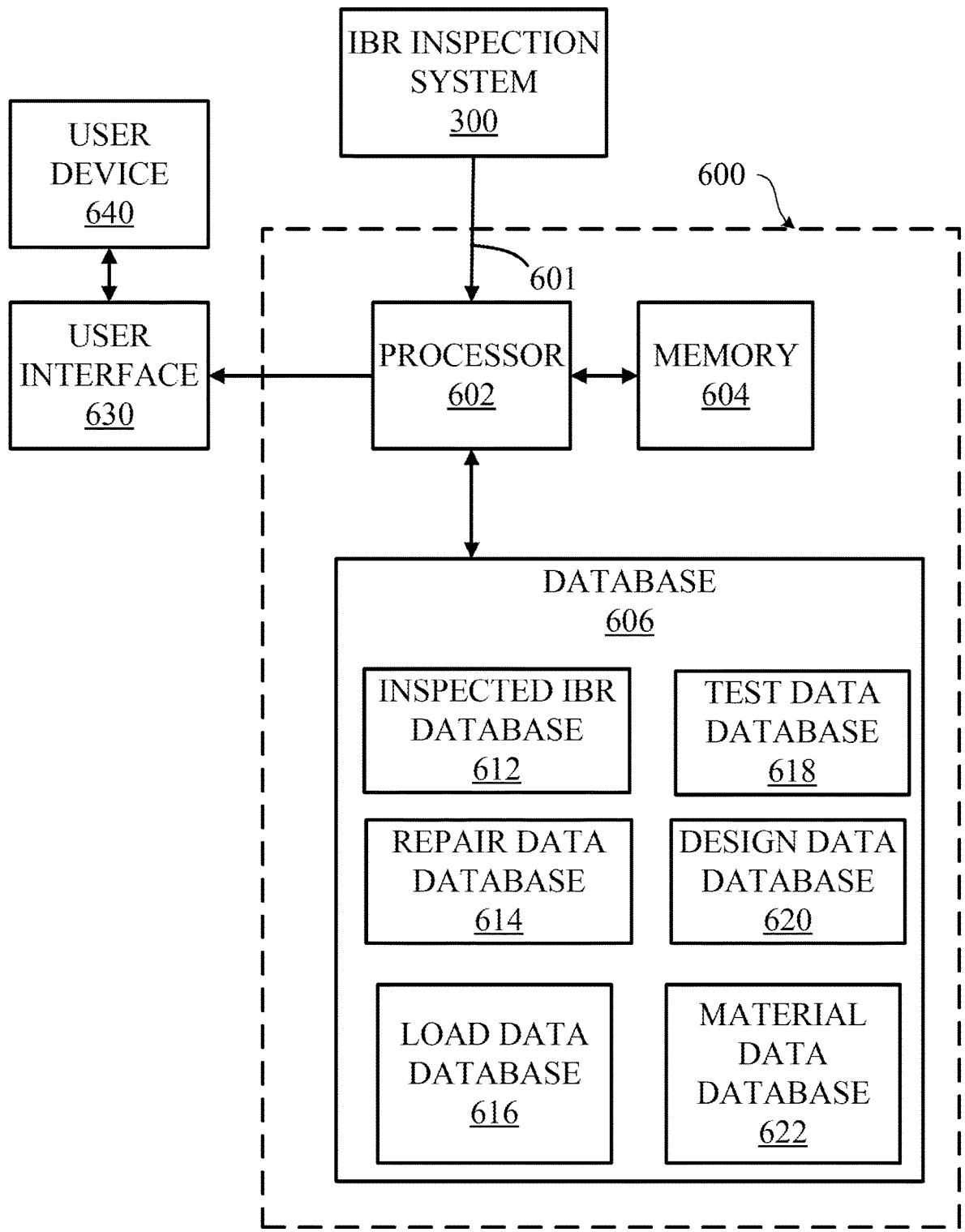
FIG. 6 illustrates an integrally bladed rotor analysis system, in accordance with various embodiments.

Referring now to FIG. 6, an IBR analysis system 600 for use in step 204 of method 200 is illustrated, in accordance with various embodiments. The IBR analysis system 600 comprises the processor 602, the memory 604, and the database 606 from FIG. 2B. In various embodiments, the IBR analysis system 600 is a computer-based system. The processor 602 is configured to receive an input 601 from the IBR inspection system 210 (e.g., via the control system 400 from FIG. 7) of step 202 in method 200. The input 601 comprises a either a point cloud or a three-dimensional model of an IBR 100 inspected in accordance with step 202 of method 200. In various embodiments, in response to receiving the point cloud, the processor 602 is configured to convert the point cloud to a three-dimensional model (e.g., a finite element model (FEM) for structural analysis, a computation fluid dynamic (CFD) model for aerodynamic analysis, or any other model utilized for analysis).

In various embodiments, the IBR analysis system 600 may include a port configured to couple to a hard drive, or any other device configured to transfer data obtained from inspecting the IBR 100 in step 202 of method 200. In various embodiments, the processor 602 may be in direct electronic (e.g., wireless or wired) communication with the IBR inspection system 210 from step 202 of method 200. In various embodiments, the processor 602 is in communication with a user interface ("UI") 630, which includes a user device 640. The IBR analysis system 600 may be configured for determining various repair options for an IBR 100 in a stack of IBRs 110 from FIG. 1A and/or outputting a repair process for the various repair options for the IBR 100 from FIG. 1A, in accordance with various embodiments. In this regard, the processor 602 of the IBR analysis system 600 is configured to receive an input 601 (e.g., from the IBR inspection system 210 of step 202 in method 200), perform various simulations, analyze the various simulations, and output at least one repair option for a respective IBR. In various embodiments, the IBR analysis system 600 may be configured to output repair options based on the stack of IBRs 110 from FIG. 1B. In this regard, the input 601 may comprise a point cloud or a three-dimensional model for each IBR 100 in a stack of IBRs 110 from FIG. 1B that have been inspected in accordance with process 500, in accordance with various embodiments.

In various embodiments, the database 606 includes an inspected IBR database 612 including available IBRs 100 for use in a stack of IBRs 110. In this regard, the IBR analysis system 600 may be configured to mix and match IBRs 100, which were on different gas turbine engines 20 from FIG. 1A previously, based on an optimal repair process, in accordance with various embodiments.

In various embodiments, the IBR analysis system 600 may store a software program configured to perform the methods described herein in the memory 604 and run the software program using the processor 602. The IBR analysis system 600 may include any number of individual processors 602 and memories 604. Various data may be communicated between the IBR analysis system 600 and a user via the UI 630 and/or the IBR inspection system 210. Such information may also be communicated between the IBR analysis system 600 and any other external devices (e.g., a computer numerical control ("CNC") machine, an additive manufacturing machine, such as a directed energy deposition (DED) machine, etc.), and/or any other computing device connected to the IBR analysis system 600 (e.g., through any network such as a local area network (LAN), or wide area network (WAN) such as the Internet).

In various embodiments, the processor 602 of the IBR analysis system 600 retrieves and executes instructions stored in the memory 604 to control the operation of the IBR analysis system 600.

In various embodiments, the database 606 comprises various stored data for use in the IBR analysis system 600 as described further herein. The database 606 may include an inspected IBR database 612, a repair data database 614, a load data database 616, a test data database 618, a design data database 620, and/or a material data database 622, in accordance with various embodiments.

In various embodiments, the inspected IBR database 612 comprises one of a point cloud or a three-dimensional model of inspected IBRs 100 received from the IBR inspection system 210 that are awaiting repair in step 206 of method 200. In this regard, the inspected IBR database 612 may include unrepaired IBRs 100 for use in the analyzing step 204 of method 200. Although described herein as including the inspected IBR database 612, the present disclosure is not limited in this regard. For example, repair options may be determined for an IBR 100 individually without analysis related to other IBRs 100 in the stack of IBRs 110 from FIG. 1B, in accordance with various embodiments. Similarly, repair options may be determined for one or more blades 103 of an IBR 100 individually without analysis related to other blades 103 for the IBR 100, in accordance with various embodiments. However, by increasing the scope to the IBR 100 component level and/or to the rotor module 111 level as described further herein, more optimal repair options may be determined (e.g., based on cost, time, amount of material removed, etc.), an IBR 100 which may have had a previously unrepairable airfoil determined at a blade level may be repairable based on a component level or module level analysis, and/or blending an airfoil without a defect to offset module or component level effects (e.g., mistuning, aerodynamic capability, etc.), in accordance with various embodiments.

In various embodiments, the repair data database 614 includes previously performed repairs (e.g., blend shapes, additive repair shapes, etc.). In this regard, the repair data database 614 may include any structural debits, aerodynamic debits or the like associated with the previously performed repairs for other IBRs (i.e., not the IBR being inspected). As such, as more repairs are determined, performed, and tested, the repair data database may become more robust, improving the IBR analysis system 600 the more the IBR analysis system 600 is utilized, in accordance with various embodiments.

In various embodiments, the load data database 616 comprises boundary conditions for the gas turbine engine 20 for use in structural analysis and aerodynamic analysis as described further herein. In this regard, for structural analysis, the boundary conditions may include temperature (i.e., highest expected blade temperature, lowest expected blade temperature, etc.), rotor speed (e.g., max rotor speed, typical rotor speed, rotor speed as a function of flight cycle, etc., rotor speed generating modal response, etc.), or any other boundary condition for the IBR 100, the stack of IBRs 110, or the high pressure compressor 52. In various embodiments, module level boundary conditions may include stack stiffness, clocking, clearances (cases, tips, back-bone bending, etc.), blade counts, axial gapping, imbalance, secondary flow influence, or the like.

In various embodiments, the test data database 618 includes engine test data associated with the IBR 100, the stack of IBRs 110, and/or the rotor module 111. For example, prior to certifying a gas turbine engine 20 from FIG. 1A for production, assumptions with respect to structural analysis performed during a design stage of development may be validated and verified through engine testing. During engine testing, strain gauges may be coupled in various locations on an IBR 100 (e.g., expected high stress locations based on the structural analysis). In response to receiving strain gauge data from the engine testing, analytical or predicted results from the structural analysis can be scaled using actual or measured results to correlate the model to actual data from the engine testing. Thus, the test data database 618 comprises actual test data to be used for scaling predicted data of the IBR analysis system 600 during processes described further herein.

In various embodiments, the design data database 620 comprises three-dimensional models of surrounding components (e.g., blade stages 101, exit guide vane stage 106, outer engine case 120, etc.). In this regard, the IBR analysis system 600 may be configured to prepare a structural model (e.g., via ANSYS, ANSYS Workbench, etc.) and/or a computational fluid dynamics (CFD) model with the surrounding components and the input 601 received from the IBR inspection system 210 and run various simulations with various repair options to determine an optimal repair for an IBR 100, for each IBR 100 in a stack of IBRs 110, or for matching repairs of IBRs 100 for various performance parameters (e.g., aerodynamic operability, mistuning, etc.). In various embodiments, the design data database further comprises an original design of the IBR being inspected. In this regard, an original three-dimensional model of the IBR 100 being inspected with nominal dimensions (i.e., nominal in accordance with a product definition of the IBR), in accordance with various embodiments.

In various embodiments, the material data database 622 comprises material data corresponding to a material of the IBR 100. In various embodiments, the IBR 100 is made of an iron-based alloy (e.g., stainless steel), nickel-based alloy, a titanium alloy, or the like. The present disclosure is not limited in this regard. In various embodiments, material properties for the material the IBR 100 is made of are stored in the material data database 622. In this regard, in response to performing a structural analysis via the IBR analysis system, the empirical results (after being scaled based on test data from the test data database 618) may be compared to a threshold zone of acceptance (e.g., a Goodman diagram with steady state stress compared to vibratory stress), where the threshold zone of acceptance is based on the material properties and a margin of safety, in accordance with various embodiments.

In various embodiments, after the processor 602 performs the various processes disclosed further herein, the processor 602 may output at least one repair process for a respective IBR 100 to the user device (e.g., through the UI 630, directly to the user device 640, or the like). In various embodiments, the output may comprise manual instructions for a repair process, a computer numerical control ("CNC") machining process (e.g., blending or the like), an additive manufacturing process (e.g., DED manufacturing or the like), a full blade replacement, patching, or any other repair process.

Figure 7:
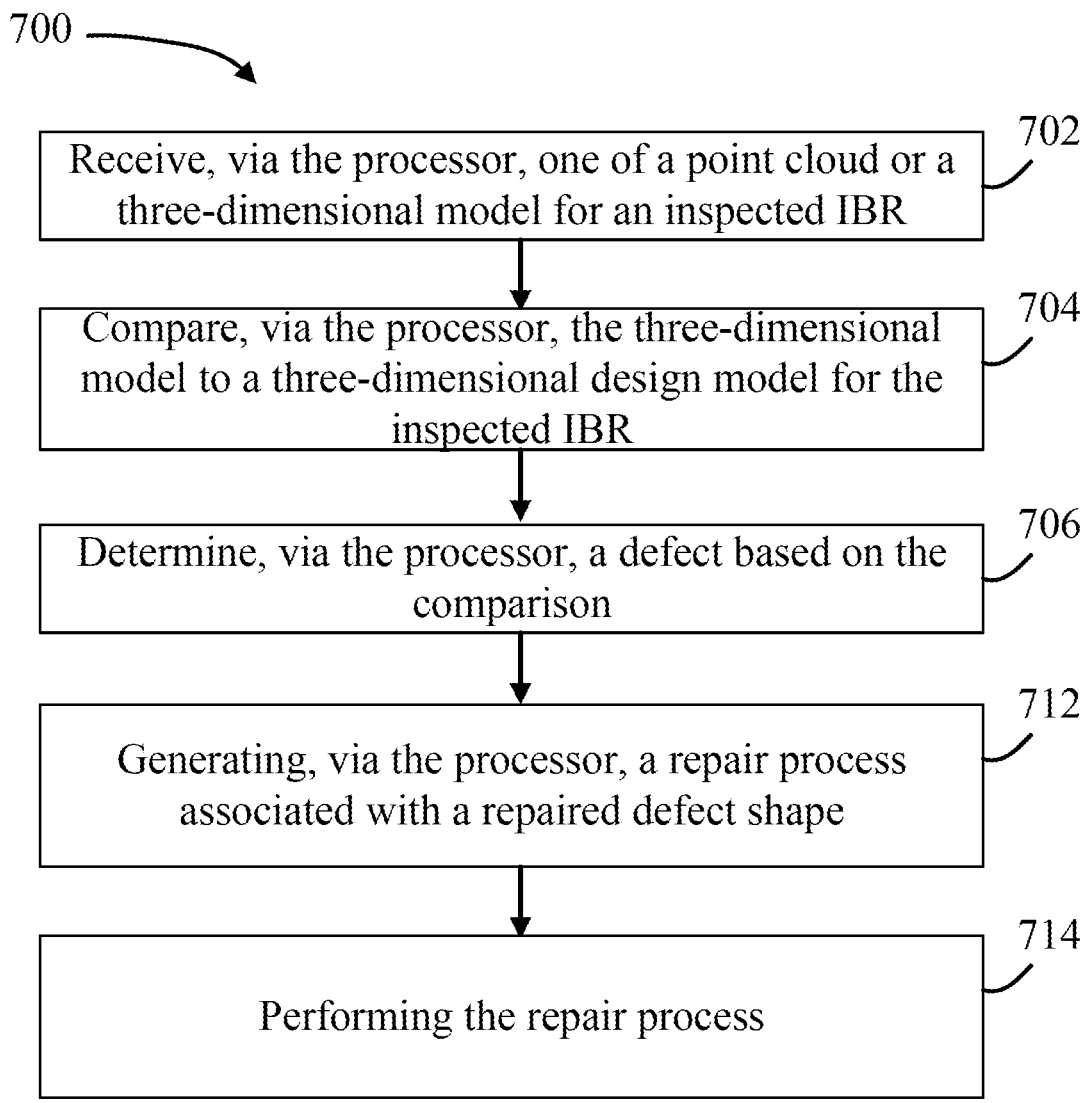
FIG. 7 illustrates a process performed by the integrally bladed rotor analysis system, in accordance with various embodiments.

Referring now to FIG. 7, a process 700 performed by the IBR analysis system 600 is illustrated, in accordance with various embodiments. The process 700 comprises receiving, via the processor 602, one of a point cloud or a three-dimensional model for an inspected IBR 100 (step 702). The point cloud or the three-dimensional model may be received from the IBR inspection system 210 as described previously herein. In various embodiments, in response to receiving a point cloud, the processor 602 may convert the point cloud to a three-dimensional model (e.g., an FEM, a CFD model, or the like). In this regard, either the IBR inspection system 210 or the IBR analysis system 600 may convert a point cloud obtained during the inspection step 202 of method 200 and still be within the scope of this disclosure.

In various embodiments, the process 700 further comprises comparing, via the processor, the three-dimensional model to a three-dimensional design model for the inspected IBR 100 (step 704). In this regard, the three-dimensional model from step 702 may be compared to nominal dimensions of the three-dimensional design model from the design data database 620. In this regard, a difference between nominal dimensions and inspected dimensions may be calculated locally across the inspected IBR 100. Thus, the difference may be compared to tolerances associated with a product definition (e.g., geometric dimensioning and tolerancing) of the IBR 100. In various embodiments, the product definition for the IBR 100 and the three-dimensional design model for the IBR 100 may be obtained from the design data database 620.

As described previously herein, the inspection system 210 defines a datum for the IBR 100 being inspected and generates a point cloud relative to the datum based on data received from the scanner 310 and sensor(s) 408, 410. In this regard, the point cloud developed from inspection system 210 defines a vast amount of discretized points representing the three-dimensional external surfaces of the IBR 100 being inspected. Thus, in step 704, the processor 602 may calculate a difference of each point in the point cloud received from the IBR inspection system 210 and a closes point to an external surface of the three-dimensional design model from step 702. The difference calculated may then be compared to a tolerance associated with the point in the point cloud.

In various embodiments, the process 700 further comprises determining, via the processor 602, a defect based on the comparison (step 706). In this regard, a defect may be determined based on the difference being outside tolerances in a respective local location of the IBR 100. For example, a leading edge of the IBR 100 may be 0.05 inches (0.125 cm) outside of tolerance at a local location. Thus, step 706 may determine that the local location is a defect and proceed to step 708. In various embodiments, defects may be determined during the inspection step 202 of method 200. For example, the IBR inspection system 210 may be configured to determine a defect in an inspected IBR 100 and increase a scan of the defect to provide additional detail for the defect, in accordance with various embodiments.

The process 700 further comprises generating, via the processor 602, a repair process associated with a repaired defect shape for the defect (step 712). In various embodiments, the repair process may be manual repair instructions generated and sent to the user device 640 (e.g., through the UI 630). In various embodiments, the repair process is associated with a CNC machine and output directly to the CNC machine or in a computer-readable format configured to be transferred to a CNC machine. In various embodiments, the repair process is associated with the repair system 230 disclosed previously herein. In this regard, the repair instructions may be transmitted directly to the system 210 to perform the repair without removing the IBR 100 being inspected. The present disclosure is not limited in this regard. In various embodiments, the repair process is associated with an additive manufacturing process (e.g., DED, powder bed diffusion, binder jetting, sheet lamination, extrusion, jetting, vat photopolymerization, etc.). In various embodiments, the repair process may be output directly to an additive manufacturing machine. In various embodiments, the repair process may be output to an additive manufacturing machine in a computer-readable format configured to be transferred to the CNC machine (e.g., via a universal serial bus (USB) drive or the like). The present disclosure is not limited in this regard.

In various embodiments, the process 700 further comprises performing the repair process (step 714).

Figure 8:
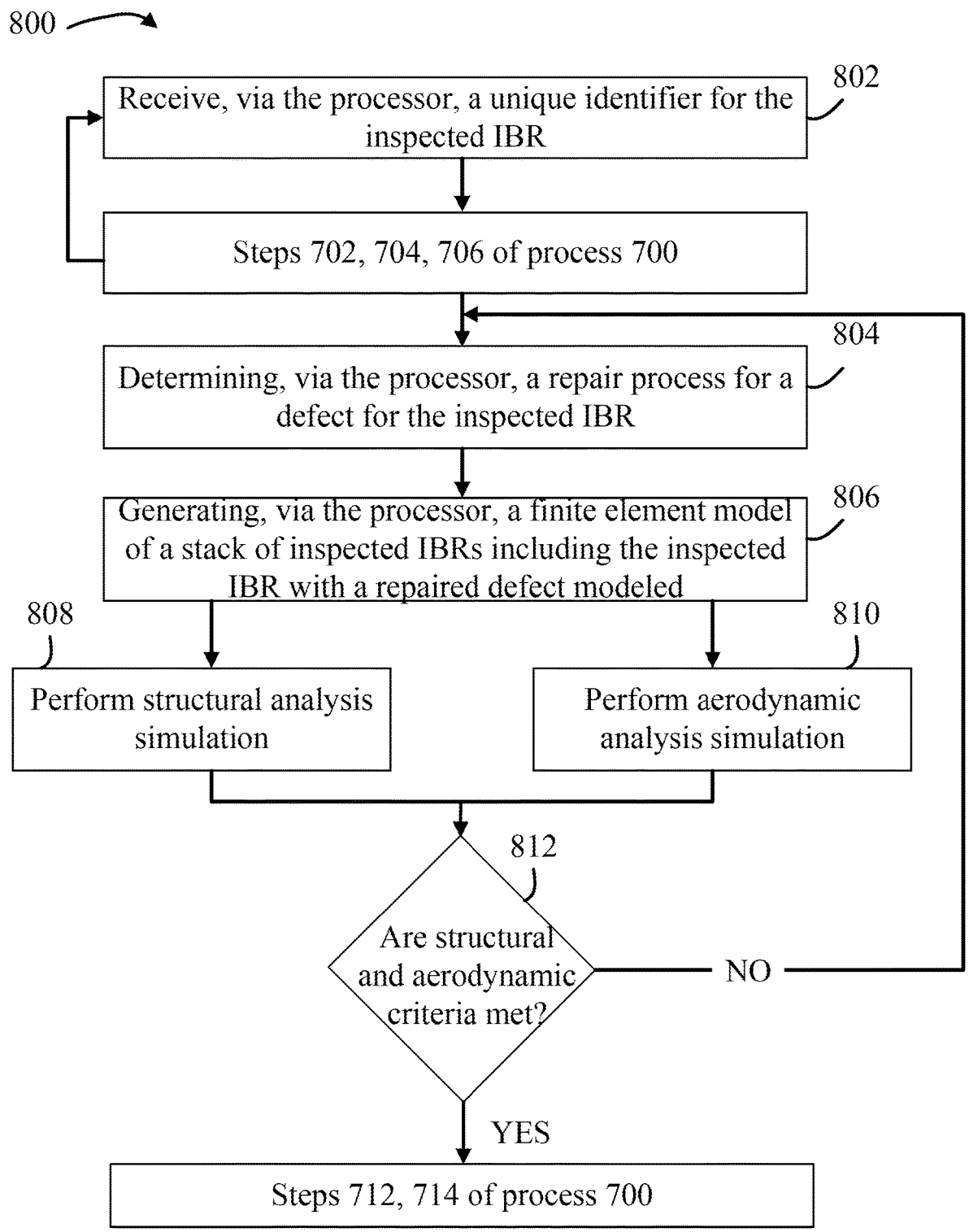
FIG. 8 illustrates a process performed by the integrally bladed rotor analysis system, in accordance with various embodiments.

Referring now to FIG. 8, a process 800 performed by the IBR analysis system 600 is illustrated, in accordance with various embodiments. The process 800 comprises receiving, via the processor 602, a unique identifier for the inspected IBR 100 (step 802). In various embodiments, the IBR inspection system 210 is configured to scan the inspected IBR 100. In response to scanning the IBR 100, the scanner 310 detects a barcode, a QR code, a radio frequency identification (RFID) tag or any other method or system for identifying an item (hereinafter the "unique identifier"). In this regard, a location of the IBR 100 in a stack of IBRs 110 may be determined.

In various embodiments, the process 800 further comprises receiving, via the processor, one of a point cloud or a three-dimensional model for the inspected IBR 100 (step 802), comparing, via the processor, the three-dimensional model to a three-dimensional design model for the inspected IBR 100 (step 704), and determining, via the processor 602, a defect based on the comparison (step 706).

In various embodiments, the process 800 further comprises repeating steps 802, 702, 704, 706, 708, and/or 710 until the point cloud or three-dimensional model for a stack of inspected IBRs 110, a location of each defect in the stack of inspected IBRs is obtained. In various embodiments, the process 800 may be repeated until several stacks of inspected IBRs 110 and their respective defects are obtained. The present disclosure is not limited in this regard.

The process 800 further comprises determining, via the processor, a repair process for a defect for the inspected IBR (step 804). In various embodiments, a repair process and/or defect repair shape is to be determined for the defect of the inspected IBR. The resultant repaired defect shape may be outside of tolerances associated with a product definition of the design model for the inspected IBR as long as structural and aerodynamic criteria of the stack of IBRs is maintained as described further herein. In various embodiments, the repair process and/or defect shape may be at a location distinct from the defect. For example, based on the structural and/or aerodynamic model from steps 808, 810, the process 800 may determine repairing a location where a defect is not located may resolve an aerodynamic or structural related issue. For example, an inspected IBR 100 may be determined to have a mistuning issue that cannot be remedied at a location of a defect causing the mistuning issue. In this regard, based on process 800, the IBR analysis system 600 may determine modifying, or blending, a non-defect location may result in a properly tuned repaired IBR, in accordance with various embodiments.

In various embodiments, the process 800 further comprises generating, via the processor 602, a finite element model for a stack of inspected IBRs with the inspected IBR including the resultant repaired defect shape (step 806).

In various embodiments, the process further comprises performing a structural analysis simulation of the stack of IBRs (step 808) and performing an aerodynamic analysis simulation (step 810) in parallel. Although depicted as being performed in parallel the present disclosure is not limited in this regard. For example, the structural analysis and the aerodynamic analysis may be performed in series and still be within the scope of this disclosure. However, by performing the processes in parallel, the analysis step 204 of method 200 may be completed more efficiently, in accordance with various embodiments. In various embodiments, two separate finite element models may be prepared in step 806 (e.g., an ANSYS model or the like for the structural analysis and a CFD model or the like for the aerodynamic analysis).

In various embodiments, the boundary conditions of the structural analysis simulation from step 808 and the aerodynamic analysis simulation from step 810 may be received from the load data database 616 as described previously herein. In various embodiments, the boundary conditions may further comprise surrounding components (e.g., vane stages 105, outer engine case 120, etc.) modeled in step 806 with the stack of inspected IBRs to provide a full simulation of the engine environment. In various embodiments, low cycle fatigue, high cycle fatigue, modal assurance criterion, vibration crack growth, etc. may be scaled based on engine test data from the test data database 618 as described previously herein.

In various embodiments, the structural analysis includes a modal analysis of the inspected IBR 100 with a potential repaired defect modeled in. In various embodiments, stresses determined from the modal analysis may be scaled based on test data received from the test data database 618.

For example, the test data database 620 may include stress experienced in a tested IBR in a development phase for the gas turbine engine. Thus, the test data may correspond to stress experienced by an IBR based on modal responses experienced on the gas turbine engine, in contrast with a bench test or other testing environment. In this regard, the test data may provide more accurate scale factors for stress in a modal analysis, which allows for tighter margins, more repair options, and more accurate tuning relative to typical systems, in accordance with various embodiments.

In various embodiments, the structural analysis includes a modal analysis of the inspected IBR 100 in a stack of inspected IBRs 110. In this regard, repairs for various defects in the stack of IBRs 110 may be iterated to achieve a desired modal response (i.e., wherein each repaired IBR in the stack of repaired IBRs is sufficiently tuned for the repaired IBR to remain below a high cycle fatigue stress threshold during operation).

In various embodiments, the aerodynamic analysis may be performed prior to the structural analysis and utilized as an input for a forcing function of vibratory analysis of the stack of repaired IBRs. For example, blending an IBR in a first stage of the compressor may affect a vibratory response of an IBR in a second stage of the compressor. Thus, various repair shapes and options may be iterated in order to achieve sufficiently tuned IBRs in each stage of a stack of IBRs being repaired in accordance with method 200 disclosed herein.

In various embodiments, the process 800 further comprises determining whether structural and aerodynamic criteria were met for the stack of IBRs (step 812). If both the structural and aerodynamic criteria were not met, the process reverts back to before step 804. In various embodiments, if the structural and/or aerodynamic criteria is not met, a new stack of IBRs may be analyzed for steps 804-812. In various embodiments, if the structural and/or aerodynamic criteria is not met, the steps 804-812 of process 800 are repeated with a different repair process based on learning from the structural simulation in step 808 and the aerodynamic simulation in step 810. In this regard, the processor 602 may be configured for machine learning (e.g., an artificial neural network (ANN) or the like). Thus, recommended repair processes and repair shapes may be improved as process 800 is repeated over time by the processor 602. In various embodiments, if the structural and the aerodynamic criteria are both met, steps 712, 714 of process 700 may be repeated to repair the inspected IBR with the resultant repaired defect shape and the repair process determined from step 804.

Figure 9:
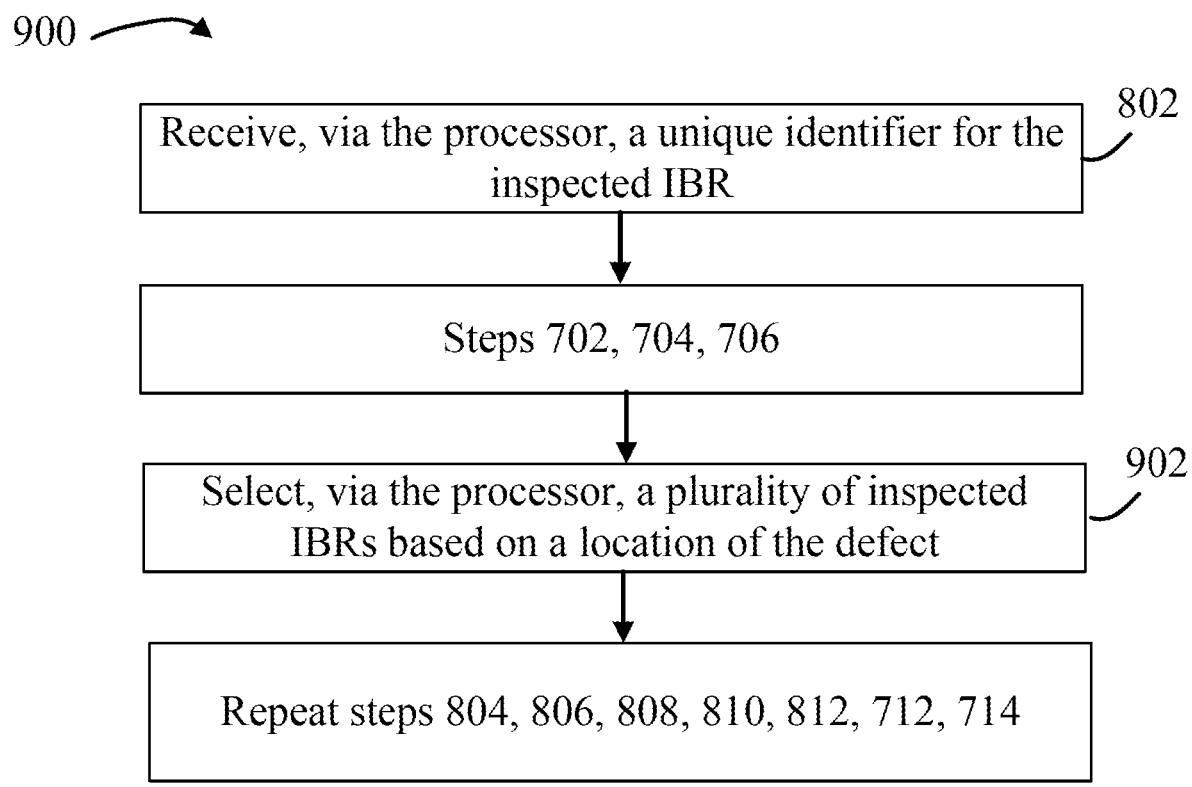
FIG. 9 illustrates a process performed by the integrally bladed rotor analysis system, in accordance with various embodiments.

Referring now to FIG. 9, a process 900 performed by the IBR analysis system 600 is illustrated, in accordance with various embodiments. In various embodiments, after receiving the unique identifier for the inspected IBR (step 802), determining a location of a defect of the inspected IBR and an associated location and size of the defect in steps 702, 704, 706, the process 900 may further comprise selecting, via the processor 602, a plurality of inspected IBRs to form a stack of inspected IBRs (step 902). In various embodiments, the plurality of inspected IBRs may be selected based on the associated location and the size of the defect. For example, for a particularly large defect, the plurality of inspected IBRs selected in step 902 may include little to no defects. In this regard, an aerodynamic performance of the stack of inspected IBRs after repair may be maintained (e.g., within acceptable criteria), where the defect of the inspected IBR may have been otherwise unsalvageable (i.e., incapable of repairing to within tolerances of the product definition of the design model from design data database 620). Similarly, in response to the defect being relatively small, inspected IBRs in the plurality of inspected IBRs selected in step 902 may include IBRs with larger defects or defects that, when repaired, compliment a repair of the inspected IBRs defect. In this regard, based on test data from test data database 618 and load data from load data database 616, as well as data obtained from process 800, a stack of IBRs may be selected based on meeting aerodynamic and/or structural criteria by balancing IBRs with little to no defects with IBRs with larger defects which may not be repairable within the tolerances of the product definition for the respective IBRs, in accordance with various embodiments. For example, if an inspected IBR 100 is insufficiently tuned at a component level, a stack of IBRs being repaired may be selected based on generating an aerodynamic environment capable of re-tuning the inspected IBR at the modular level. In this regard, an IBR in a stage before the insufficiently tuned IBR 100 that includes a repair shape (i.e., a blend, a patch, or additive material) that may help re-tune the inspected IBR may be analyzed by the analysis system 600 as described further herein.

In various embodiments, the process 900 further comprises repeating steps 804, 806, 808, 810, 812, 712, and 714 from process 800.

Figure 10:
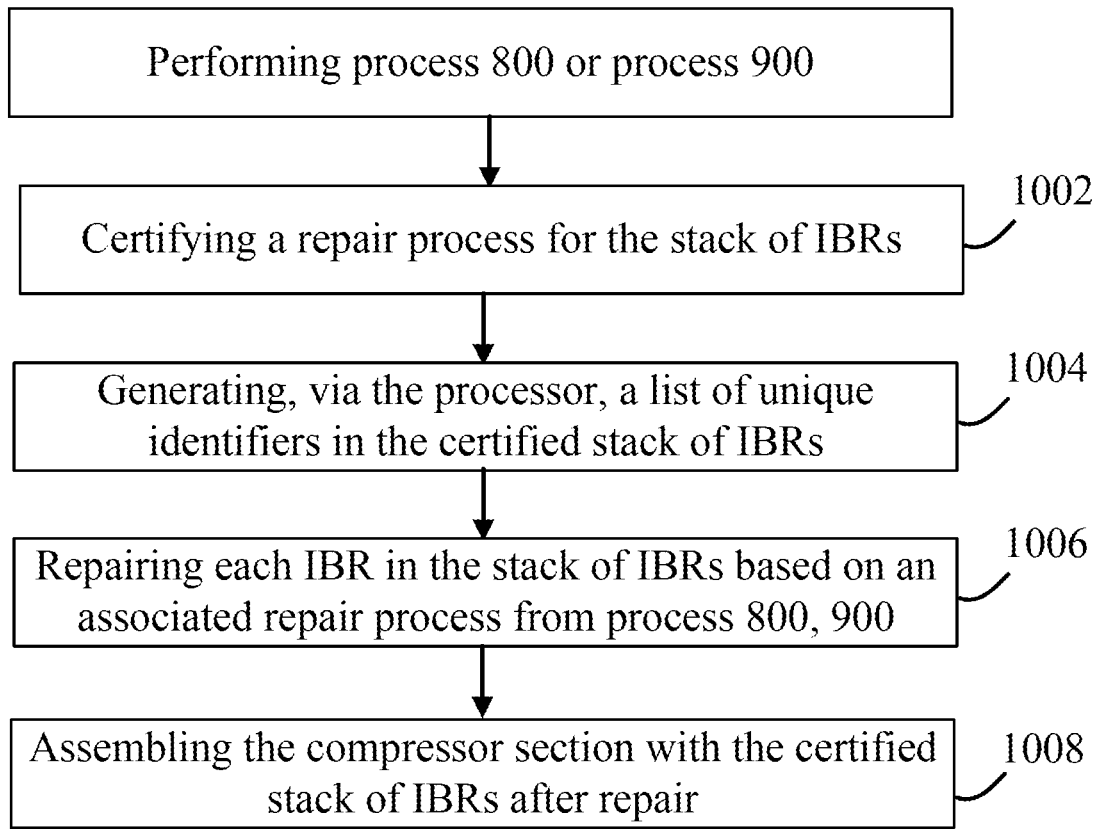
FIG. 10 illustrates a process performed by the integrally bladed rotor analysis system, in accordance with various embodiments.

Referring now to FIG. 10, a after performing process 800 or process 900, the process 800, 900 may further comprise certifying repair processes for each IBR in the stack of inspected IBRs together (step 1002). In this regard, as the repair process and repair shape of defects in inspected IBRs are based on structural capabilities and aerodynamic performance of the rotor module 111 after the repairs, the repair processes determined for each defect are correlated to the stack of IBRs utilized in the simulations from steps 808, 810. In this regard, the process 800, 900, may further comprise generating, via the processor, a list of unique identifiers in the certified stack of IBRs (step 1004), repairing each IBR in the stack of certified IBRs based on associated repair processes for each defect in the stack of certified IBRs (step 1006), and assembling a compressor section 24 of the gas-turbine engine 20 from FIG. 1A with the certified stack of IBRs after repair (step 1008).

In various embodiments, after a certain number of iterations (e.g., 10 or more), the processes 800, 900 may determine that the inspected IBR has to be scrapped. In this regard, the processes 800, 900 may continue to iterate to attempt to develop a repair process that meets structural and aerodynamic capabilities for a repaired IBR for a pre-determined number of times prior to determining that a repair is not feasible and the IBR should be scrapped.

In various embodiments, after a certain number of iterations (e.g., 5 or more), the processes 800, 900 may begin performing analysis at slightly different rotor speeds for the stack of IBRs. In this regard, based on analyzing the IBRs at a module level (e.g., at the rotor module 111 level), rotor speed may be modified for a gas turbine engine 20 from FIG. 1A in order to accommodate a repair process for an IBR that may have otherwise been scrapped. In this regard, the processor 602 may further output a rotor speed that could accommodate a repair process if the IBR would have otherwise been scrapped. In various embodiments, the process 800, 900 may further comprise modifying the FADEC to facilitate operating the rotor with the inspected IBR at a rotor speed that is different from an initial rotor speed.

Figure 11:
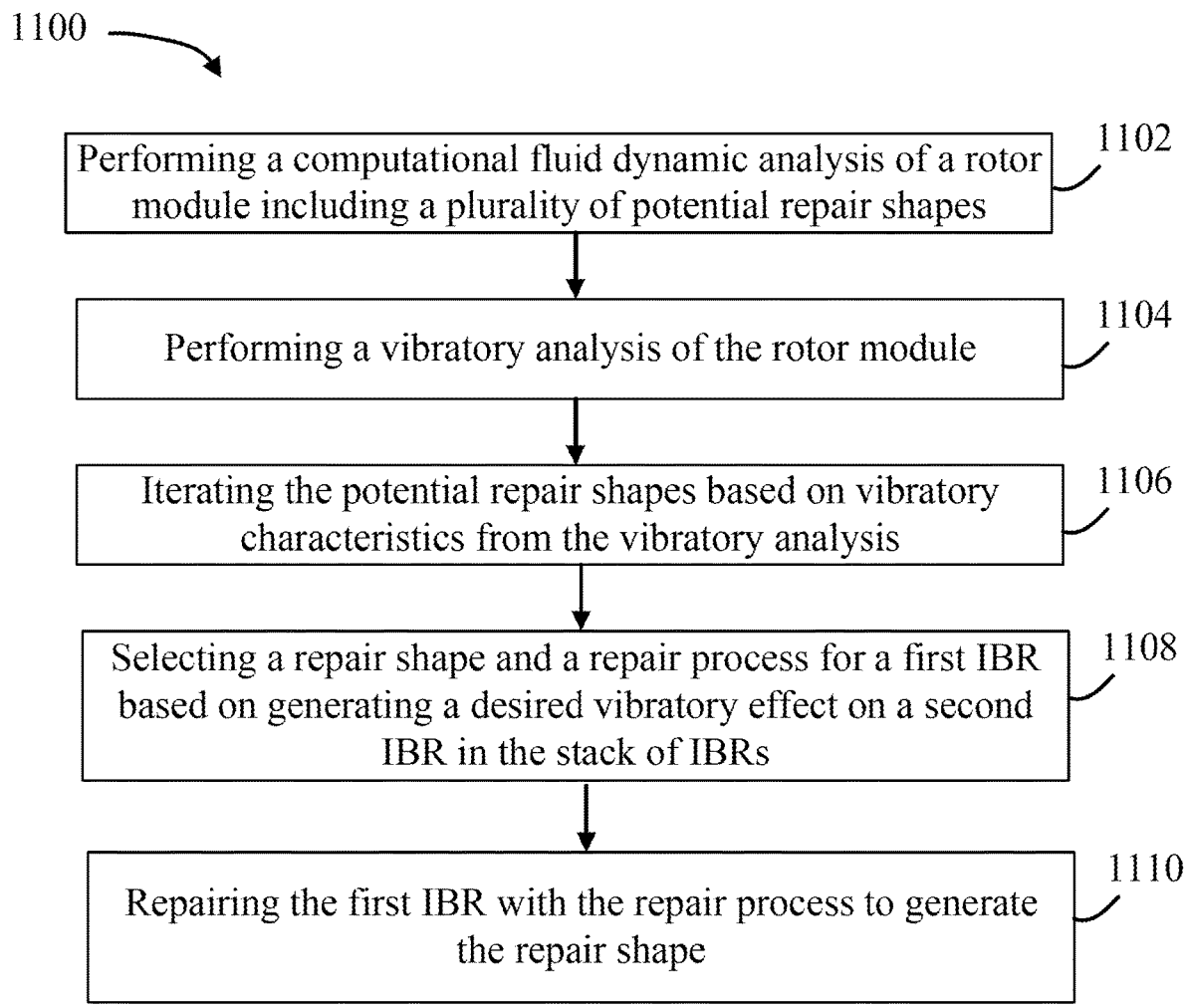
FIG. 11 illustrates a method of repairing an integrally bladed rotor, in accordance with various embodiments.

Referring now to FIG. 11, a method of repairing an inspected IBR is illustrated, in accordance with various embodiments. The method 1100 comprises performing a computational fluid dynamics (CFD) analysis of a rotor module including a plurality of potential repair shapes (step 1102). The rotor module may include a CFD model generated from measured data (e.g., measured in accordance with process 500 described previously herein) for each IBR in the CFD analysis. In this regard, each IBR in the CFD analysis may have been previously inspected and stored in a database of the analysis system 600 for use in the CFD analysis. In various embodiments, the CFD analysis is in accordance with the aerodynamic analysis of step 810 described previously herein. In various embodiments, the plurality of potential repair shapes may be based on a default blend shape, a default patch shape, a default additive shape, or the like. The present disclosure is not limited in this regard. In various embodiments each potential repair shape is based on a prior iteration of a similar defect shape. In this regard, the method 1100 may be configured for machine learning (e.g., an artificial neural network (ANN) or the like) as described previously herein.

The method 1100 further comprises performing a vibratory analysis of the rotor module based on the CFD analysis (step 1104). In this regard, predicted air flow through the stack of IBRs being repaired may be utilized as a boundary condition in a forcing function analysis of the stack of IBRs being repaired.

The method 1100 further comprises iterating the potential repair shapes based on vibratory characteristics from the vibratory analysis (step 1106). In various embodiments, the vibratory characteristics may include a predicted vibratory stress during engine operation, shifting an excitation frequency outside of a frequency range associated with an operating range of the rotor module for the gas turbine engine or the like. Any vibratory characteristic that may be affected from a module level is within the scope of this disclosure. In various embodiments, iterating the potential repair shapes includes performing the vibratory analysis multiple times with different potential repair shapes each time. In various embodiments, the different potential repair shapes are based on the prior iteration. For example, in response to the vibratory stress being greater thana a vibratory stress threshold, the potential repair shape may be modified to adjust a flow around the potential repair shape to adjust a vibratory response of at a location of the vibratory stress.

In various embodiments, the method 1100 further comprises selecting a repair shape and a repair process for a first IBR based on generating a desired vibratory effect for a second IBR in the stack of IBRs (step 1108). In this regard, a repair shape for a first IBR may include a blend that is larger than a typical blend selected for the first IBR if only the blade of the IBR were being analyzed, or if only the IBR itself was being analyzed. In this regard, the selected blend may be selected based on generating fluid dynamics that create a desired vibratory effect of the second IBR. For example, the desired vibratory effect may be greater damping for the second IBR, reduced vibratory stresses of the second IBR, shifting an undesirable mode outside of a frequency range associated with an operating range of the rotor module, or the like.

In various embodiments, the method 1100 further comprises repairing the first IBR with the repair process to generate the repair shape (step 1110). In this regard, the repair process may be transmitted back to the repair system 230 of the system 210, and the repair system 230 may perform the selected repair. Thus, in various embodiments, method 200 from FIG. 2A disclosed herein may be entirely automated. In various embodiments, method 200 may be partially automated (e.g., the repair process may be performed with manual input or the inspection process may be performed with some manual input). The present disclosure is not limited in this regard.

Figure 12:
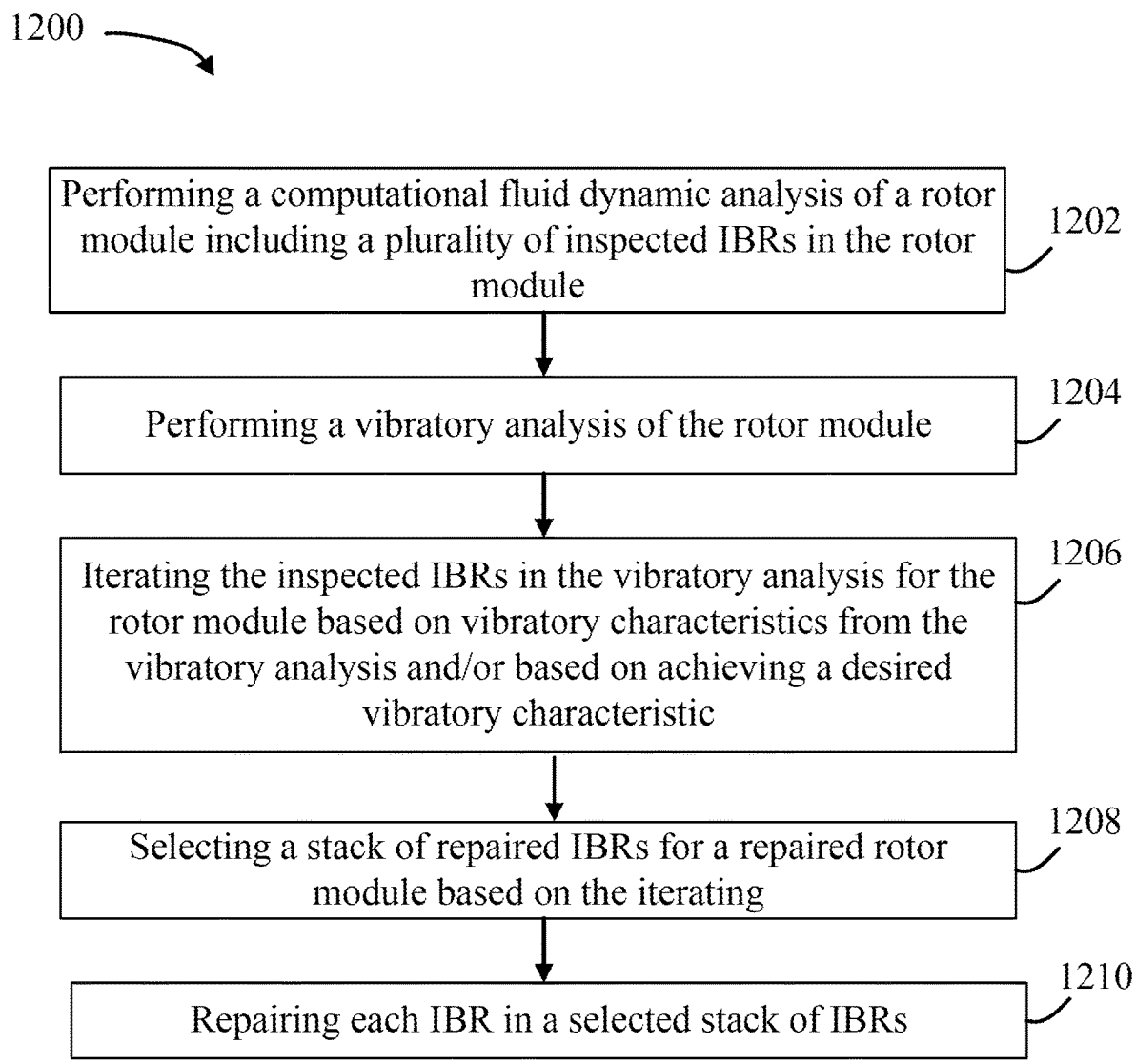
FIG. 12 illustrates a method of selecting and repairing a stack of integrally bladed rotors, in accordance with various embodiments.

Referring now to FIG. 12, a method 1200 of repairing a stack of IBRs is illustrated, in accordance with various embodiments. The method 1200 comprises performing a computation fluid dynamic analysis of a rotor module including a plurality of inspected IBRs in the rotor module (step 1202). In various embodiments, each IBR in the plurality of inspected IBRs was inspected in accordance with process 500 disclosed previously herein. In various embodiments, a model generated for the computational fluid dynamics analysis may include a potential repair shape for any detected defects during the inspection process 500. However, the present disclosure is not limited in this regard. For example, the model for the computational fluid dynamics may be initially performed without any repairs and be iterated from there and remain within the scope of this disclosure.

In various embodiments, the method 1200 further comprises performing a vibratory analysis of the rotor module (step 1204). In various embodiments, the vibratory analysis is based on inputs from the computational fluid dynamic analysis (step 1202). In this regard, actual, measured, geometrical data of an inspected IBR may be utilized in the computational fluid dynamics analysis and vibratory analysis and scaled or adjusted based on testing data or the like as described previously herein to determine an optimal repair for a stack of inspected integrally bladed rotors.

In various embodiments, the method 1200 further comprises iterating the inspected IBRs in the vibratory analysis for the rotor module based on vibratory characteristics from the vibratory analysis for the rotor module based on vibratory characteristics from the vibratory analysis and/or based on achieving a desired vibratory characteristic (step 1206). In this regard, in various embodiments, in order to dampen an excitation response, and a corresponding stress, for a first IBR, a second inspected IBR may be selected for a next iteration of the vibratory analysis. Similarly, predicted vibratory characteristics may be determined for each inspected IBR on a component level (e.g., via a forced response or a FEM model) and the predicted vibratory characteristics may be utilized to select a next iteration of a repaired rotor module to achieve a desired vibratory environment for the stack of IBRs.

In various embodiments, the method 1200 further comprises selecting a stack of repaired IBRs for a repaired rotor module based on the iterating (step 1208). In this regard, based on mixing and matching potential stacks of repaired IBRs in accordance with the method 1200, previously unrepairable IBRs may be utilized based on modifying vibratory and/or flow characteristics of the system due the mixing and matching.

In various embodiments, the method 1200 further comprises repairing each IBR in a selected stack of IBRs based on the stack of repaired IBRs (step 1210). In this regard, repair shapes, repair sizes, etc. for each IBR in the selected stack of IBRs may be based on achieving an acceptable vibratory response for an inspected IBR that may otherwise be incapable of achieving an acceptable vibratory response at a component level. For example, a predicted stress at a component level of a repaired IBR in the stack of repaired IBRs may be above a threshold stress for the repaired IBR, whereas a second predicted stress at a rotor module level of the repaired IBR in the stack of repaired IBRs may be below the threshold stress and thus acceptable to be repaired as long as the repaired IBR is paired with the stack of select IBRs in from step 1208, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method of repairing an integrally bladed rotor (IBR), the method comprising:
performing a vibratory analysis of a rotor module including a first IBR with a repaired defect shape for the first IBR;
determining an undesirable vibratory characteristic of a second IBR in the rotor module;
iterating the repaired defect shape for the first IBR to eliminate the undesirable vibratory characteristic of the second IBR; and
repairing the first IBR with a selected repair shape based on determining the repaired defect shape eliminates the undesirable vibratory characteristic.

2. The method of claim 1, further comprising generating a computational fluid dynamics model with the first IBR and the second IBR based on measured data from an IBR inspection system.

3. The method of claim 1, further comprising;
retrieving a test engine data from a database, and
scaling vibratory stress data from the vibratory analysis based on the test engine data.

4. The method of claim 1, wherein the undesirable vibratory characteristic is a vibratory stress that exceeds a vibratory stress threshold for the second IBR.

5. The method of claim 1, wherein the selected repair shape includes a first blend shape that is larger than a second blend shape, the second blend shape determined from performing a second vibratory analysis for only the first IBR.

6. The method of claim 1, wherein:
the first IBR was inspected prior to the performing the vibratory analysis, and
the second IBR was inspected prior to the determining the undesirable vibratory characteristic.

7. The method of claim 1, further comprising:
inspecting the first IBR prior to the performing the vibratory analysis; and
inspecting the second IBR prior to the determining the undesirable vibratory characteristic.

8. The method of claim 1, further comprising performing a computation fluid dynamics analysis prior to performing the vibratory analysis.

9. The method of claim 8, further comprising determining boundary conditions of the vibratory analysis based at least in part on the computation fluid dynamics analysis.

10. An article of manufacture including a tangible, non-transitory computer-readable storage medium having instructions stored thereon that, in response to execution by a processor, cause the processor to perform operations comprising:
receiving, via the processor, one of a point cloud and a three-dimensional model for an inspected integrally bladed rotor (IBR) and a defect including a defect shape, a defect size, and a defect location;
iterating, via the processor, a repaired defect shape associated with a repair process based on a vibratory analysis of a stack of inspected IBRs; and
determining, via the processor, a final repair shape for the defect based on a predicted vibratory impact on a second inspected IBR in the stack of inspected IBRs.

11. The article of manufacture of claim 10, wherein the predicted vibratory impact is reducing an estimated vibratory stress in the second inspected IBR from above a vibratory stress threshold to below the vibratory stress threshold.

12. The article of manufacture of claim 10, wherein the repaired defect shape is outside of a tolerance for a product definition of a designed IBR associated with the inspected IBR.

13. The article of manufacture of claim 10, wherein the operations further comprise performing a computation fluid dynamic analysis of the stack of inspected IBRs prior to iterating the repaired defect shape.

14. The article of manufacture of claim 13, wherein a boundary condition for the vibratory analysis is based at least in part on a result of the computational fluid dynamics analysis.

15. The article of manufacture of claim 10, wherein a predicted vibratory stress in the second inspected IBR is greater than a vibratory stress threshold in response to performing a second vibratory analysis at an IBR level.

16. The article of manufacture of claim 15, wherein a second predicted vibratory stress in the second inspected IBR is less than the vibratory stress threshold in response to performing the vibratory analysis with the stack of inspected IBRs.

17. A system, comprising:
a support structure;
a scanner moveably coupled to the support structure;
at least one of an additive component or a subtractive component moveably coupled to the support structure; and
a controller in electronic communication with the scanner and at least one of the additive component or the subtractive component, the controller configured to:
receive from the scanner, a point cloud of an integrally bladed rotor (IBR);
transmit the point cloud to an analysis system; and
receive from the analysis system a repair shape for a defect of the IBR, the repair shape based on modifying a predicted vibratory characteristic of a second IBR in a stack of inspected IBRs, the stack of inspected IBRs being simulated by the analysis system.

18. The system of claim 17, wherein the controller is further configured to command one of the additive component or the subtractive component to generate the repair shape for the defect of the IBR.

19. The system of claim 17, wherein the predicted vibratory characteristic is a predicted vibratory stress.

20. The system of claim 19, wherein the predicted vibratory stress is reduced from a first predicted vibratory stress that is above a vibratory stress threshold to a second predicted vibratory stress that is below the vibratory stress threshold in response to the repair shape.

\* \* \* \* \*